United States Patent [19]
Terada et al.

[11] Patent Number: 5,305,131
[45] Date of Patent: Apr. 19, 1994

[54] LIQUID CRYSTAL COMPOSITION HAVING AN IMPROVED TEMPERATURE DEPENDENCE OF RESPONSE SPEED, LIQUID CRYSTAL DEVICE AND DISPLAY APPARATUS

[75] Inventors: Masahiro Terada, Atsugi; Masataka Yamashita, Hiratsuka; Kazuharu Katagiri, Tama; Akio Yoshida, Hiratsuka; Shosei Mori; Syuji Yamada, both of Atsugi, all of Japan

[73] Assignee: Canon Kabushiki Kaisha, Tokyo, Japan

[21] Appl. No.: 979,812

[22] Filed: Nov. 20, 1992

[30] Foreign Application Priority Data

Nov. 22, 1991 [JP] Japan .................. 3-307802
Nov. 22, 1991 [JP] Japan .................. 3-307803
Jan. 30, 1992 [JP] Japan .................. 4-038391
Jan. 30, 1992 [JP] Japan .................. 4-038392

[51] Int. Cl.$^5$ ............................... G02F 1/133
[52] U.S. Cl. ........................... 359/104; 359/100
[58] Field of Search ........... 359/99, 100, 103, 104; 252/299.61

[56] References Cited

U.S. PATENT DOCUMENTS

| | | | |
|---|---|---|---|
| 4,367,924 | 1/1983 | Clark et al. | 359/100 |
| 4,533,488 | 8/1985 | Fukui et al. | 252/299.61 |
| 4,561,726 | 12/1985 | Goodby et al. | 359/75 |
| 4,721,367 | 1/1988 | Yoshinaga et al. | 359/100 |
| 4,778,259 | 10/1988 | Kitayama et al. | 359/100 |
| 4,867,903 | 9/1989 | Nohira et al. | 252/299.61 |
| 5,114,613 | 5/1992 | Yoshinaga et al. | 252/299.61 |
| 5,139,697 | 8/1992 | Togano et al. | 252/299.61 |
| 5,143,643 | 9/1992 | Iwaki et al. | 252/299.61 |
| 5,173,211 | 12/1992 | Yamashita et al. | 252/299.61 |
| 5,183,586 | 2/1993 | Terada et al. | 252/299.61 |
| 5,186,858 | 2/1993 | Terada et al. | 252/299.61 |
| 5,240,637 | 8/1993 | Shinjo et al. | 359/104 |

FOREIGN PATENT DOCUMENTS

| | | |
|---|---|---|
| 0444705 | 9/1991 | European Pat. Off. |
| 95892 | 12/1971 | Fed. Rep. of Germany |
| 5434 | 2/1987 | Japan |
| 158415 | 6/1989 | Japan |
| 252624 | 11/1991 | Japan |

OTHER PUBLICATIONS

Umeda et al., SID Digest of Technical Papers, (1985), 373:76.
Nagano et al., Jpn. J. Appl. Phys., vol. 19, No. 10, (1980), 2013:14.
Ouchi et al., Jpn. J. Appl. Phys., vol. 27, No. 5, (1988), L725:8.

*Primary Examiner*—William L. Sikes
*Assistant Examiner*—Huy Mai
*Attorney, Agent, or Firm*—Fitzpatrick, Cella, Harper & Scinto

[57] ABSTRACT

A liquid crystal device with a decreased temperature-dependence of response speed is obtained by using a liquid crystal composition having a temperature range where the composition assumes chiral smectic C phase. The temperature range of chiral smectic C phase includes a) a first temperature range where the liquid crystal composition shows a cone angle in chiral smectic C phase which increases on temperature decrease down to a mediate temperature, and b) a second temperature range, below the first temperature range, where the liquid crystal composition shows a cone angle in chiral smectic C phase which decreases on further temperature decrease below the mediate temperature.

65 Claims, 21 Drawing Sheets

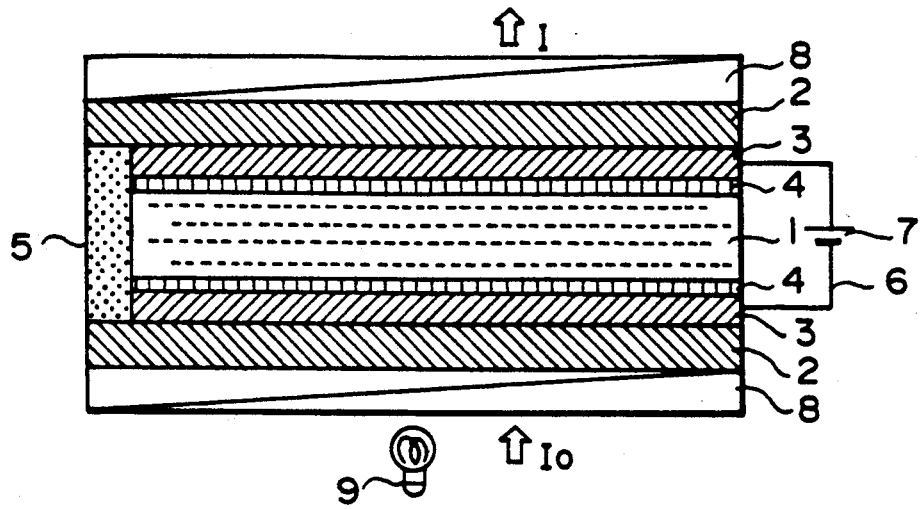
F I G. 1
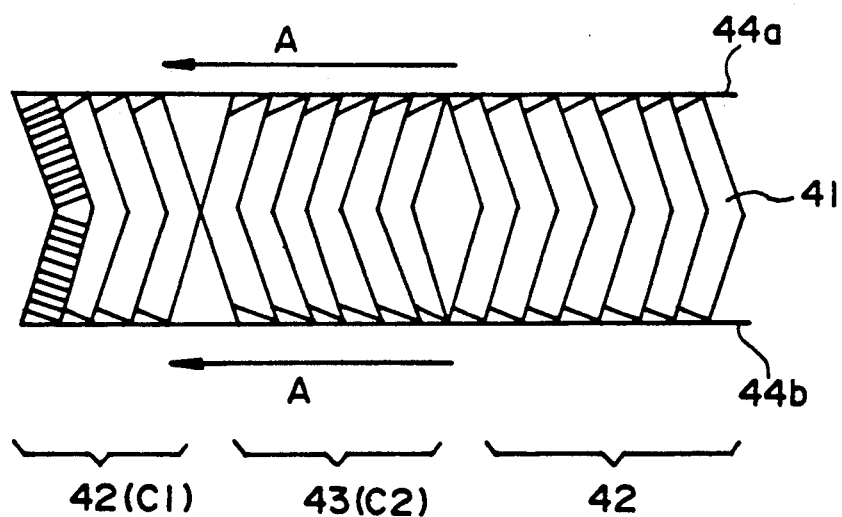
F I G. 4

C1 ALIGNMENT  Ⓗ + δ > α

C2 ALIGNMENT  Ⓗ − δ > α

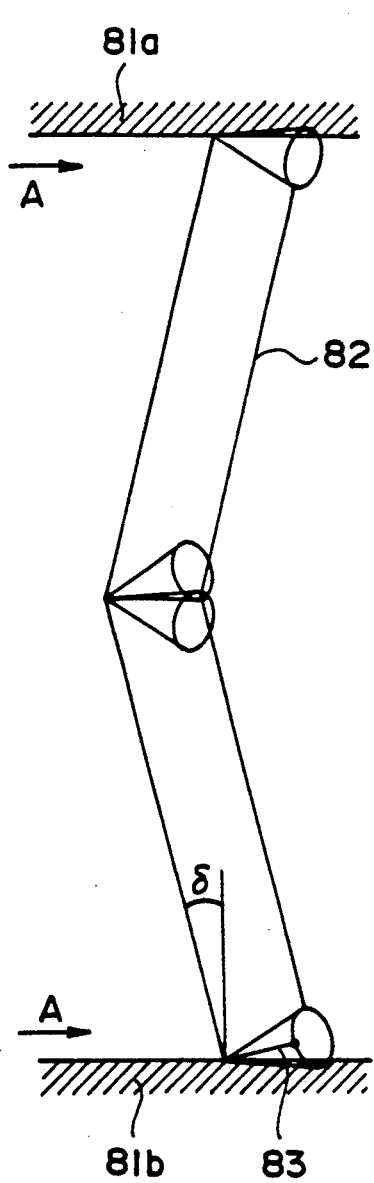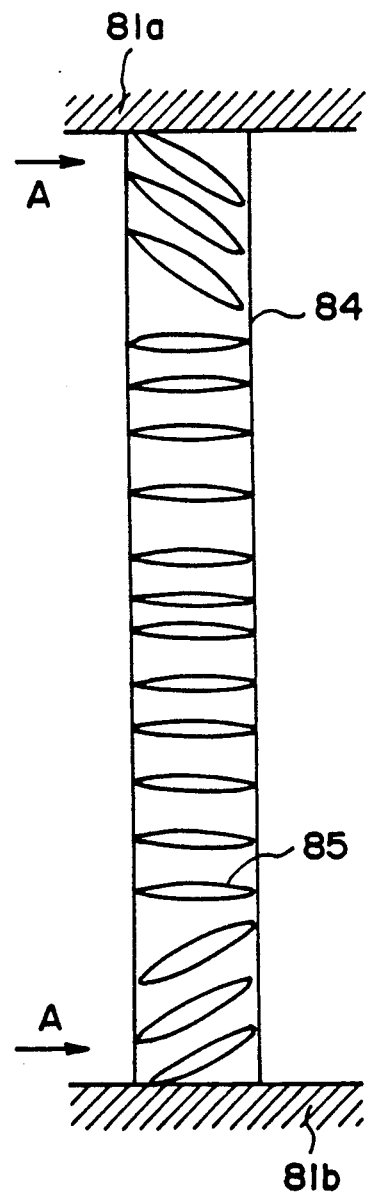
F I G. 8     F I G. 9

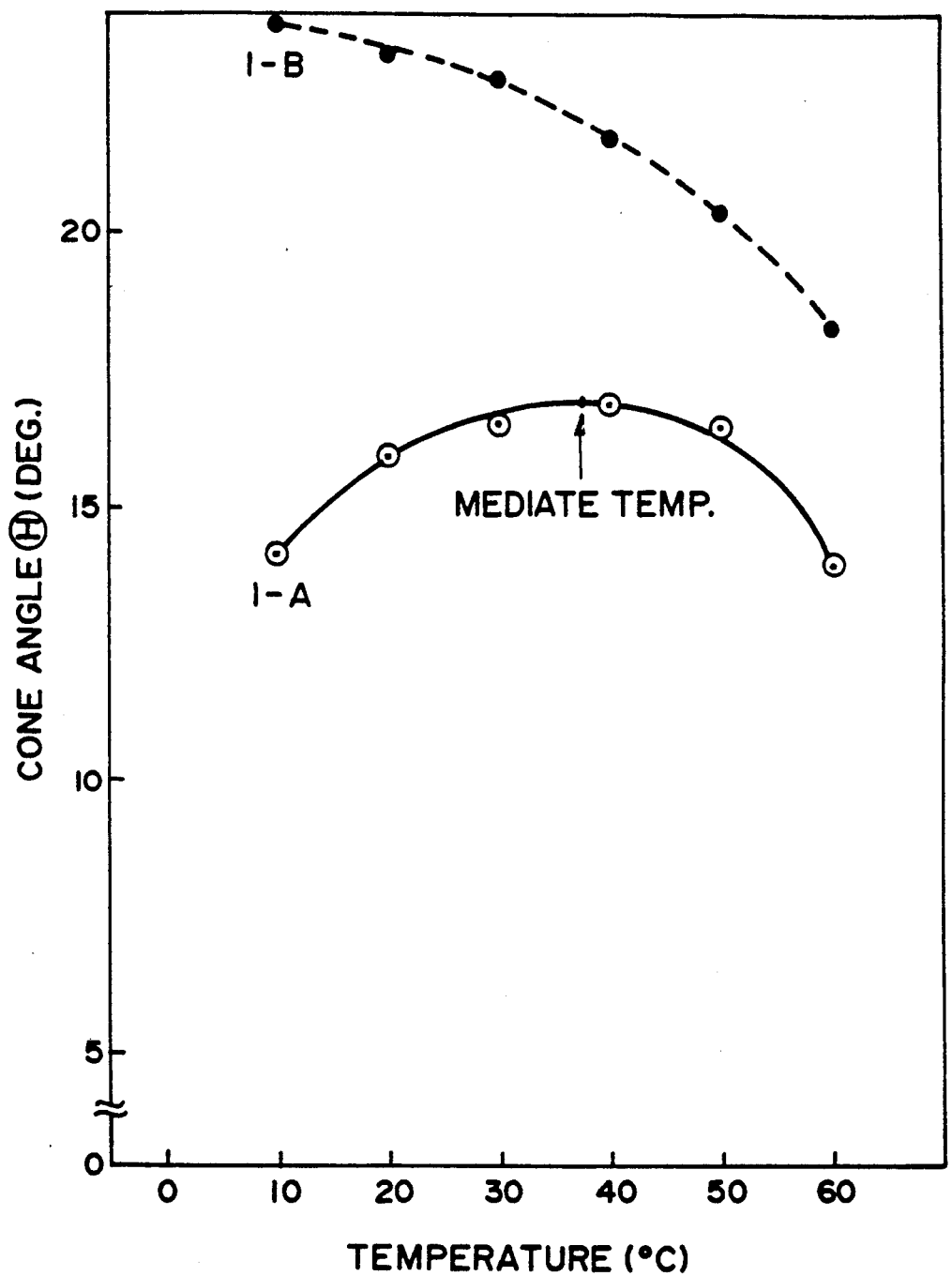
F I G. 12

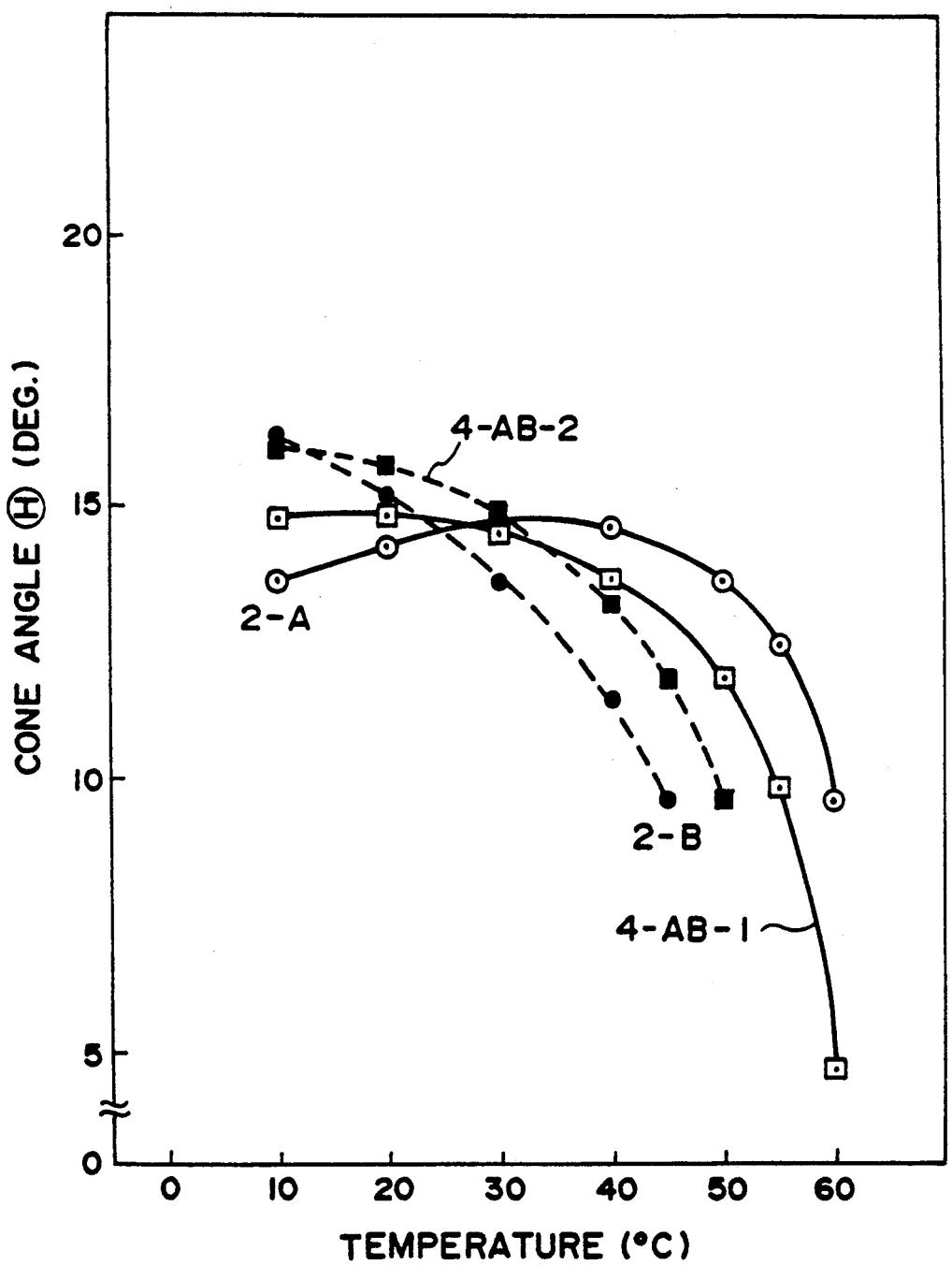
F I G. 16

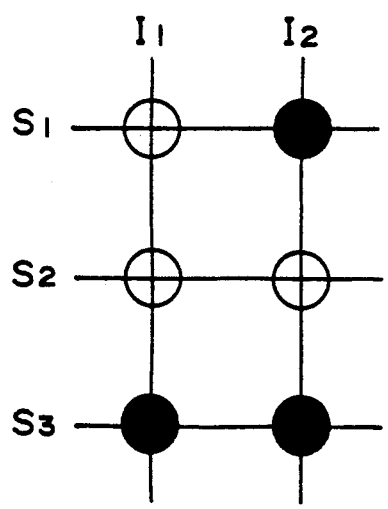
F I G. 22
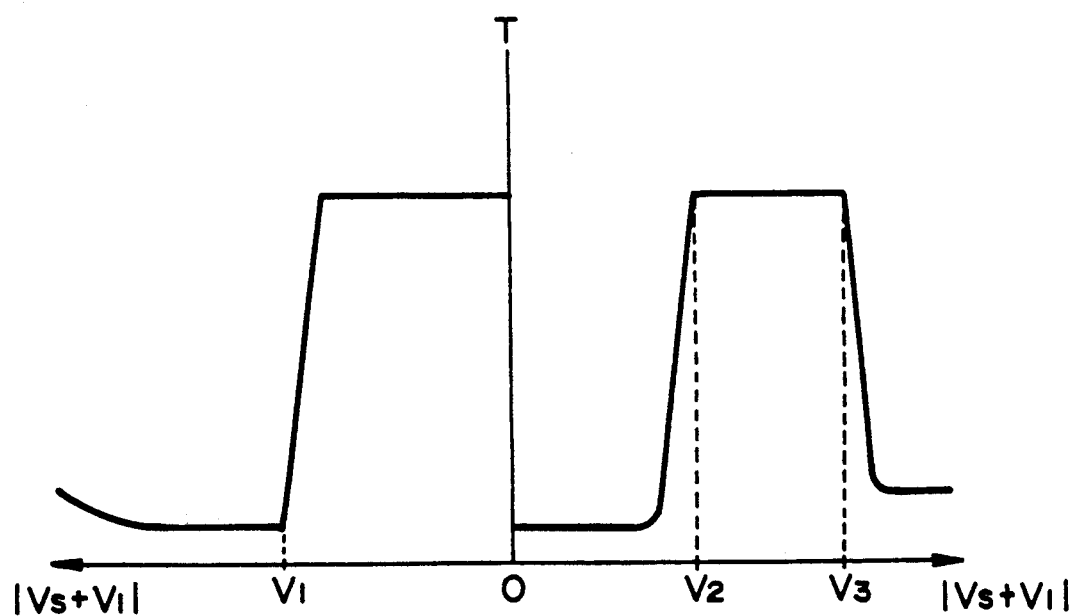
F I G. 23

LIQUID CRYSTAL COMPOSITION HAVING AN IMPROVED TEMPERATURE DEPENDENCE OF RESPONSE SPEED, LIQUID CRYSTAL DEVICE AND DISPLAY APPARATUS

FIELD OF THE INVENTION AND RELATED ART

The present invention relates to a liquid crystal composition, and a liquid crystal device and a display apparatus using the composition. More particularly, the present invention relates to a novel liquid crystal composition improved in responsiveness to an electric field, a liquid crystal device using the composition suitable for use in a liquid crystal display apparatus, a liquid crystal-optical shutter, etc., and a display apparatus using the liquid crystal device.

Hitherto, liquid crystal devices have been used as an electro-optical device in various fields. Most liquid crystal devices which have been put into practice use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

These devices are based on the dielectric alignment effect of a liquid crystal and utilize an effect that the average molecular axis direction is directed to a specific direction in response to an applied electric field because of the dielectric anisotropy of liquid crystal molecules. It is said that the limit of response speed is on the order of milli-seconds, which is too slow for many uses.

On the other hand, a simple matrix system of driving is most promising for application to a large-area flat display in view of cost, productivity, etc., in combination. In the simple matrix system, an electrode arrangement wherein scanning electrodes and signal electrodes are arranged in a matrix, and for driving, a multiplex driving scheme is adopted wherein an address signal is sequentially, periodically and selectively applied to the scanning electrodes and prescribed data signals are selectively applied in parallel to the signal electrodes in synchronism with the address signal.

When the above-mentioned TN-type liquid crystal is used in a device of such a driving system, a certain electric field is applied to regions where a scanning electrode is selected and signal electrodes are not selected or regions where scanning electrode is not selected and a signal electrode is selected (which regions are so called "half-selected points").

If the difference between a voltage applied to the selected points and a voltage applied to half-selected points is sufficiently large, and a voltage threshold level required for allowing liquid crystal molecules to be aligned or oriented perpendicular to an electric field is set to a value therebetween, display devices normally operate. However, in fact, as the number (N) of scanning lines increases, a time (duty ratio) during which an effective electric field is applied to one selected point when a whole image area (corresponding to one frame) is scanned decreases with a ratio of 1/N.

Accordingly, the larger the number of scanning lines are, the smaller is the voltage difference of an effective value applied to a selected point and non-selected points when scanning is repeatedly effected. This leads to unavoidable drawbacks of lowering of image contrast or occurrence of interference or crosstalk.

These phenomena are regarded as essentially unavoidable problems appearing when a liquid crystal having no bistability (i.e. liquid crystal molecules are horizontally oriented with respect to the electrode surface as stable state and is vertically oriented with respect to the electrode surface only when an electric field is effectively applied) is driven (i.e. repeatedly scanned) by making use of a time storage effect.

To overcome these drawbacks, the voltage averaging method, the two-frequency driving method, the multiple matrix method, etc. has been already proposed. However, any method is not sufficient to overcome the above-mentioned drawbacks. As a result, it is the present state that the development of large image area or high packaging density in respect to display elements is delayed because it is difficult to sufficiently increase the number of scanning lines.

To overcome drawbacks with such prior art liquid crystal devices, the use of liquid crystal devices having bistability has been proposed by Clark and Lagerwall (e.g. Japanese Laid-Open Patent Appln. (JP-A). 56-107216, U.S. Pat. No. 4,367,924, etc.) In this instance, as the liquid crystals having bistability, ferroelectric liquid crystals having chiral smectic C-phase (SmC*) or H-phase (SmH*) are generally used.

These liquid crystals have bistable states of first and second stable states with respect to an electric field applied thereto. Accordingly, as different from optical modulation devices in which the above-mentioned TN-type liquid crystals are used, the bistable liquid crystal molecules are oriented to first and second optically stable states with respect to one and the other electric field vectors, respectively. Further, this type of liquid crystal has a property (bistability) of assuming either one of the two stable states in response to an applied electric and retaining the resultant state in the absence of an electric field.

In addition to the above-described characteristic of showing bistability, the ferroelectric liquid crystal has an excellent property, i.e., a high-speed responsiveness. This is because the spontaneous polarization of the ferroelectric liquid crystal and an applied electric field directly interact with each other to induce transition of orientation states. The resultant response speed is faster than the response speed due to the interaction between dielectric anisotropy and an electric field by 3 to 4 digits.

Thus, a ferroelectric liquid crystal potentially has very excellent characteristics, and by making use of these properties, it is possible to provide essential improvements to many of the above-mentioned problems with the conventional TN-type devices. Particularly, the application to a high-speed optical shutter and a display of a high density and a large picture is expected. For this reason, there has been made extensive research with respect to liquid crystal materials showing ferroelectricity. However, ferroelectric liquid crystal materials developed heretofore cannot be said to satisfy sufficient characteristics required for a liquid crystal device including low-temperature operation characteristic, high-speed responsiveness, etc.

Among a response time $\tau$, the magnitude of spontaneous polarization Ps and viscosity $\eta$, the following relationship exists: $\tau = \eta/(Ps \cdot E)$, where E is an applied voltage. Accordingly, a large response speed can be obtained by (a) increasing the spontaneous polarization, (b) lowering the viscosity $\eta$, or (c) increasing the applied voltage. However, the driving voltage has a certain upper limit in view of driving with IC, etc., and should desirably be as low as possible. Accordingly, it is actually necessary to lower the viscosity or increase the spontaneous polarization.

A ferroelectric chiral smectic liquid crystal having a large spontaneous polarization generally provides a large internal electric field in a cell given by the spontaneous polarization and is liable to pose many constraints on the device construction giving bistability. Further, an excessively large spontaneous polarization is liable to accompany an increase in viscosity, so that a remarkable increase in response speed may not be attained as a result.

Further, if it is assumed that the operation temperature of an actual display device is 10°–40° C., the response speed changes by a factor of about 10, so that a system for temperature compensation becomes complicated.

Further, in case of a display apparatus with a large display area liable to be accompanied with a large temperature deviation, it has been required to provide, e.g., a means for heating the display area at a constant temperature.

As described hereinabove, commercialization of a ferroelectric liquid crystal device requires a chiral smectic liquid crystal composition having, a high-speed responsiveness based on a large spontaneous polarization and a low viscosity, and a small temperature-dependence of response speed.

SUMMARY OF THE INVENTION

An object of the present invention is to provide a liquid crystal composition effective for alleviating the temperature-dependence of response speed, particularly a liquid crystal composition showing a ferroelectric chiral smectic phase, in order to realize a ferroelectric liquid crystal device with desired operating characteristics as described above.

Another object of the present invention is to provide a liquid crystal device and a display apparatus using such a liquid crystal composition.

According to a first aspect of the present invention, there is provided a liquid crystal composition having a temperature range where the composition assumes chiral smectic C phase, said temperature range including:

a) a first temperature range where the liquid crystal composition shows a cone angle in chiral smectic C phase which increases on temperature decrease down to a mediate temperature, and b) a second temperature range, below the first temperature range, where the liquid crystal composition shows a cone angle in chiral smectic C phase which decreases on further temperature decrease below the mediate temperature.

According to a second aspect of the present invention, there is provided a liquid crystal device, comprising a pair of substrates, and the above-mentioned liquid crystal composition disposed between the substrates and placed in the temperature range of the chiral smectic C phase.

According to a third aspect of the present invention, there is provided a liquid crystal device, comprising: a pair of substrates, and a liquid crystal composition disposed between the substrates and placed in an alignment state of chiral smectic C phase such that the liquid crystal molecules are oriented to any one of at least two optically stable states which form an angle $2\theta a$ therebetween ($\theta a$; tilt angle) in the absence of an electric field, the liquid crystal molecules are aligned to form a plurality of liquid crystal molecule layers of chiral smectic C phase each comprising a plurality of molecules and being inclined at an inclination angle $\delta$ with respect to a normal to the substrates; and the liquid crystal molecules are aligned at a pretilt angle $\alpha$ with respect to the substrates;

wherein the liquid crystal composition has a temperature range where it assumes the chiral smectic C phase, said temperature range including:

a) a first temperature range where the liquid crystal composition shows a cone angle $\textcircled{H}$ in chiral smectic C phase which increases on temperature decrease down to a mediate temperature, and b) a second temperature range, below the first temperature range, where the liquid crystal composition shows a cone angle $\textcircled{H}$ in chiral smectic C phase which decreases on further temperature decrease below the mediate temperature; and the angles $\theta a$, $\textcircled{H}$, $\delta$ and $\alpha$ satisfy the relationships of:
c) $\textcircled{H} < \alpha + \delta$,
d) $\delta < \alpha$, and
e) $\textcircled{H} > \theta a > \textcircled{H}/2$.

According to a fourth aspect of the present invention, there is provided a liquid crystal composition, having: a temperature range of smectic A phase wherein the composition forms a plurality of first molecular layers each composed of plural liquid crystal molecules in smectic A phase, and also a temperature range of chiral smectic C phase wherein the composition forms a plurality of second molecular layers each composed of plural liquid crystal molecules in chiral smectic C phase, the second molecular layers being formed through deformation from the first molecular layers and showing a degree of deformation with respect to the first molecular layers which varies at different temperatures;

said temperature range of chiral smectic C phase including a) a first temperature range where the second molecular layers show a degree of deformation which increases on temperature decrease down to a mediate temperature, and b) a second temperature range, below the first temperature range, where the second molecular layers show a degrees of deformation which decreases on further temperature decrease below the mediate temperature.

According to a fifth aspect of the present invention, there is provided a liquid crystal device, comprising: a pair of substrates, and a liquid crystal composition disposed between the substrates and placed in a temperature range of chiral smectic C phase and in an alignment state such that the liquid crystal molecules are aligned to form a plurality of molecular layers each composed of plural liquid crystal molecules and being inclined at an inclination angle $\delta$ with respect to a normal to the substrates; said temperature range of chiral smectic C phase including:

a) a first temperature range where the inclination angle $\delta$ increases on temperature decrease down to a mediate temperature, and b) a second temperature range, below the first temperature range, where the inclination angle $\delta$ decreases on further temperature decrease below the mediate temperature.

According to a sixth aspect of the present invention, there is provided a liquid crystal device, comprising: a pair of substrates, and a liquid crystal composition having a cone angle $\widehat{H}$, disposed between the substrates and placed in an alignment state of chiral smectic C phase such that the liquid crystal molecules are oriented to any one of at least two optically stable states which form an angle $2\theta a$ therebetween ($\theta a$; tilt angle) in the absence of an electric field, the liquid crystal liquid crystal molecules are aligned to form a plurality of liquid crystal molecular layers of chiral smectic C phase each comprising a plurality of molecules and being inclined at an inclination angle $\delta$ with respect to a normal to the substrates; and the liquid crystal molecules are aligned at a pretilt angle $\alpha$ with respect to the substrates;

wherein the liquid crystal composition has a temperature range where it assumes the chiral smectic C phase, said temperature range including:

a) a first temperature range where the inclination angle $\delta$ in chiral smectic C phase increases on temperature decrease down to a mediate temperature, and b) a second temperature range, below the first temperature range, where the inclination angle $\delta$ in chiral smectic C phase decreases on further temperature decrease below the mediate temperature; and the angles $\theta a$, $\widehat{H}$, $\delta$ and $\alpha$ satisfy the relationships of:

c) $\widehat{H} < \alpha + \delta$,
d) $\delta < \alpha$, and
e) $\widehat{H} > \theta a > \widehat{H}/2$.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic sectional view of an embodiment of the liquid crystal device according to the present invention.

FIG. 4 is an illustration of C1 and C2 alignment states.

FIG. 8 is a schematic sectional view of a chevron structure in chiral smectic C phase.

FIG. 9 is a schematic sectional view of a molecular layer in smectic A phase.

FIGS. 12 through 16 are respectively graphs showing temperature-dependence of cone angle for various liquid crystal compositions.

FIG. 22 is an illustration of a display pattern obtained by an actual drive using the time-serial waveforms shown in FIG. 21B.

FIG. 23 is a V-T characteristic chart showing a change in transmittance under application of varying drive voltages.

DESCRIPTION OF THE PREFERRED EMBODIMENTS

Figure 2:
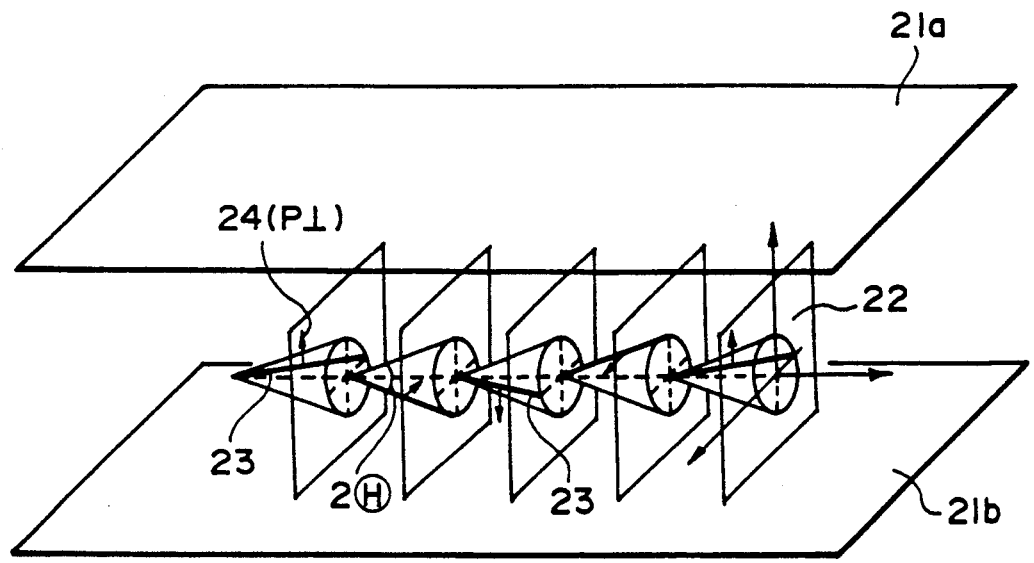
FIG. 2 is a perspective view showing schematically an alignment of a chiral smectic liquid crystal having a helical structure.

FIG. 1 is a schematic sectional view of an embodiment of the liquid crystal device using a chiral smectic liquid crystal layer for describing a structure of the liquid crystal device utilizing ferroelectricity.

Referring to FIG. 1, the liquid crystal device includes a chiral smectic liquid crystal layer 1 disposed between a pair of glass substrates 2 each having thereon a transparent electrode 3 and an insulating alignment control layer 4. Lead wires 6 are connected to the electrodes 3 so as to apply a driving voltage to the liquid crystal layer 1 from a power supply 7. Outside the substrates 2, a pair of polarizers 8 are disposed so as to modulate incident light $I_0$ from a light source 9 in cooperation with the liquid crystal 1 to provide modulated light I.

Each of two glass substrates 2 is coated with a transparent electrode 3 comprising a film of $In_2O_3$, $SnO_2$ or ITO (indium-tin-oxide) to form an electrode plate. Further thereon, an insulating alignment control layer 4 is formed by rubbing a film of a polymer such as polyimide with gauze or acetate fiber-planted cloth so as to align the liquid crystal molecules in the rubbing direction. Further, it is also possible to compose the alignment control layer of two layers, e.g., by first forming an insulating layer of an inorganic material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, or magnesium fluoride, and forming thereon an alignment control layer of an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Alternatively, it is also possible to use a single layer of inorganic insulating alignment control layer or organic insulating alignment control layer. An inorganic insulating alignment control layer may be formed by vapor deposition, while an organic insulating alignment control layer may be formed by applying a solution of an inorganic insulating material or a precursor thereof in a concentration of 0.1 to 20 wt. %, preferably, 0.2-10 wt. %, by spinner coating, dip coating, screen printing, spray coating or roller coating, followed by curing or hardening under prescribed hardening condition (e.g., by heating). The inorganic insulating layer may have a thickness of ordinarily 30 Å-1 μm, preferably, 40-3000 Å, further preferably 40-1000 Å.

The two glass substrates 2 with transparent electrodes 3 (which may be inclusively referred to herein as "electrode plates") and further with insulating alignment control layers 4 thereof are held to ave a prescribed (but arbitrary) gap with a spacer 5. For example, such a cell structure with a prescribed gap may be formed by sandwiching spacers of silica heads or alumina beads having a prescribed diameter with two glass plates, and then sealing the periphery thereof with, e.g., an epoxy adhesive. Alternatively, a polymer film or glass fiber may also be used as a spacer. Between the two glass plates, a chiral smectic liquid crystal is sealed to provide a ferroelectric liquid crystal layer in a thickness of generally 0.5 to 20 μm, preferably 1 to 5 μm.

It is desired that the liquid crystal 1 has an SMC* phase (chiral smectic C phase) in a broad temperature range including room temperature, particular at a lower temperature side thereof, and provides a device showing a broad drive voltage margin and a broad drive temperature margin.

Further, in order to show a monodomain state in a good alignment characteristic in a device, it is preferred that the liquid crystal has a phase transition series of isotropic—Ch (cholesteric) phase—SmA (smectic A) phase—SmC* (chiral smectic C) phase.

The transparent electrodes 3 are connected to the eternal power supply 7 through the lead wires 6. Further, outside the glass substrates 2, polarizers 8 are applied. The device shown in FIG. 1 is of a transmission type.

FIG. 2 is a schematic illustration of a ferroelectric liquid crystal cell (device) for explaining operation thereof. Reference materials 21a and 21b denote substrates (glass plates) on which a transparent electrode of, e.g., $In_2O_3$, $SnO_2$, ITO (indium-tin-oxide), etc., is disposed. respectively. A liquid crystal of an SmC*-phase (chiral smectic C phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P1) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P1) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
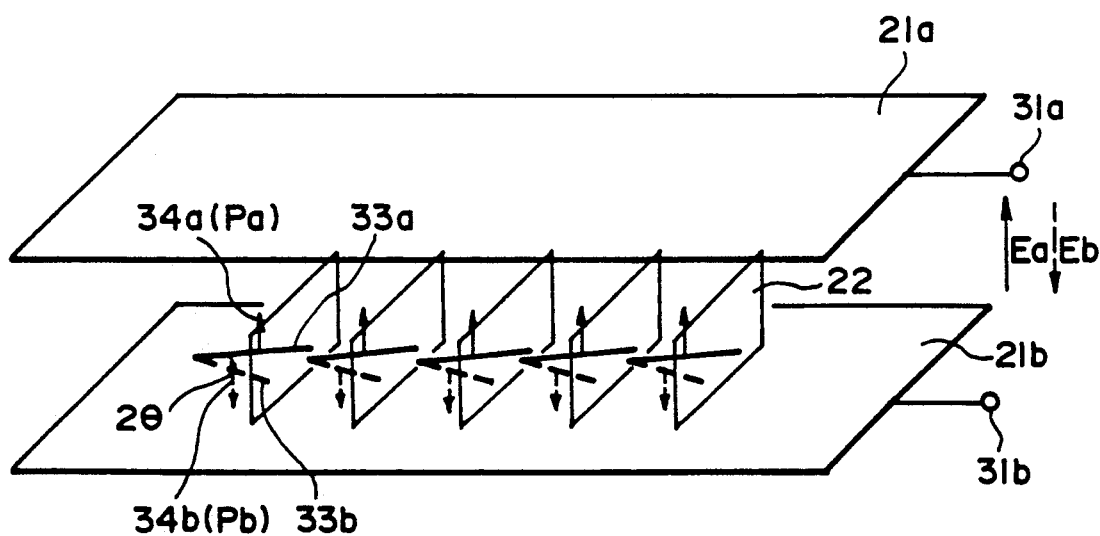
FIG. 3 is a perspective view showing schematically an alignment state of a chiral smectic liquid crystal having a non-helical structure.

Further, when the liquid crystal cell is made sufficiently thin (e.g., less than 10 μm), the helical structure of the liquid crystal molecules is unwound to provide a non-helical structure uneven in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

A first advantage attained by using such a ferroelectric liquid crystal cell is that the response speed is quite fast, and a second advantage is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereof, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

Figure 10:
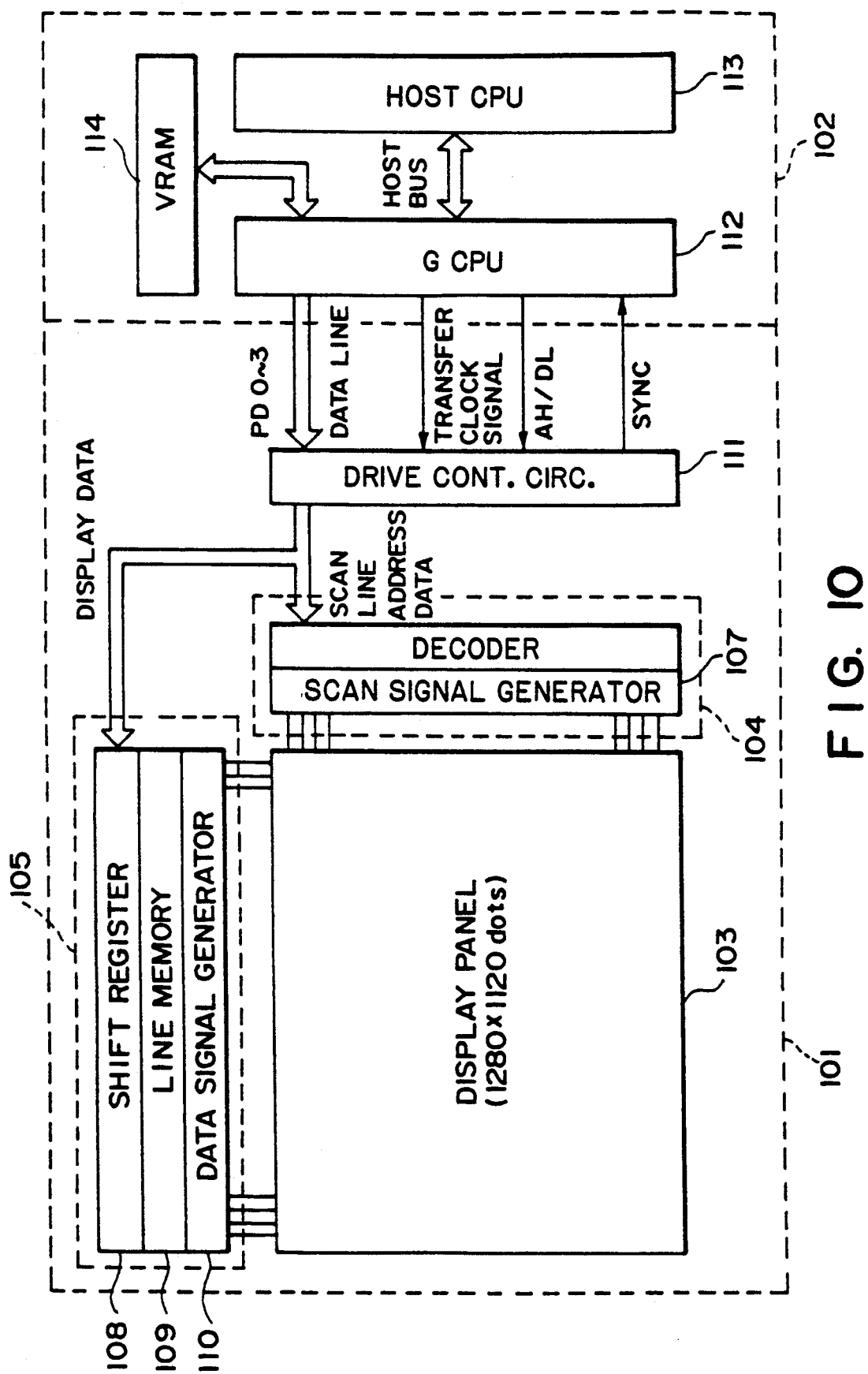
FIG. 10 is a block diagram of a liquid crystal display apparatus and a graphic controller.
Figure 11:
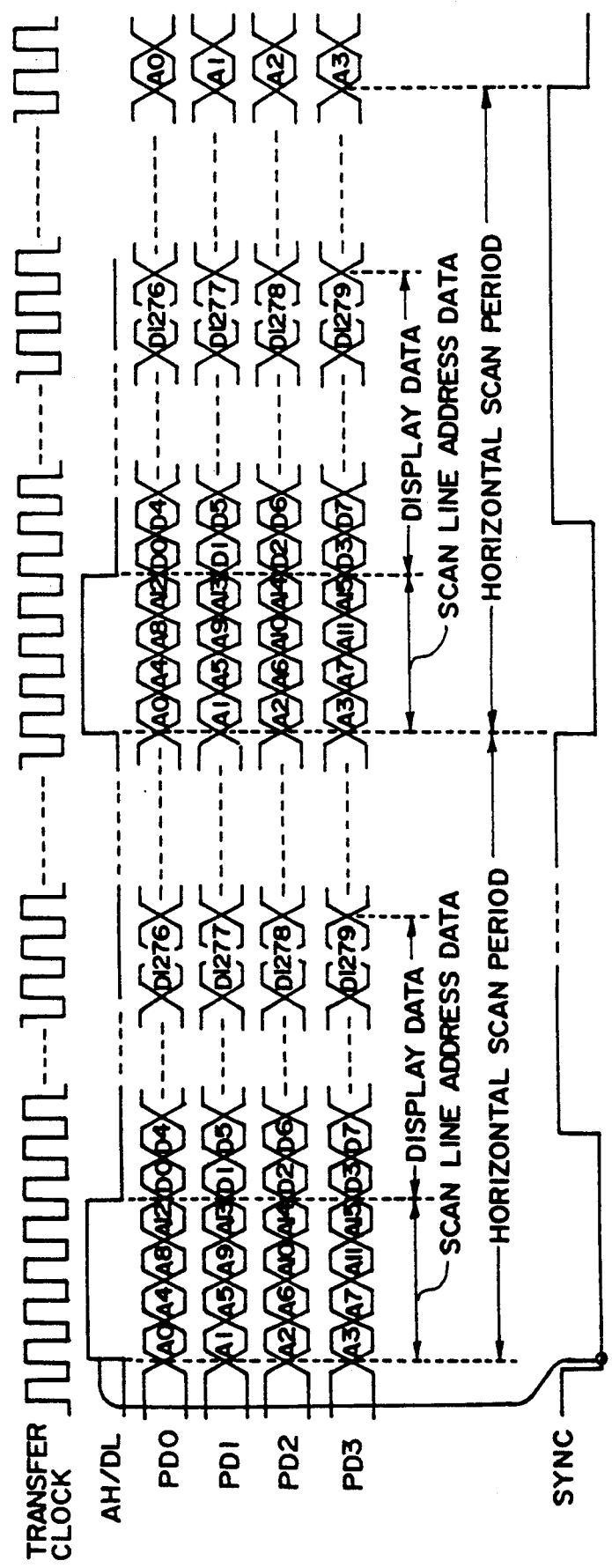
FIG. 11 is a time chart showing time correlation for image data communication between the liquid crystal display apparatus and the graphic controller.

A liquid crystal display apparatus may be constituted by using the liquid crystal device for a display panel and by adopting an arrangement and data format comprising image data accompanied with scanning line address data and also a communication synchronization scheme using a SYNC signal as shown in FIGS. 10 and 11.

Image data are generated in a graphic controller 102 in an apparatus body and transferred to the display panel 103 (illuminated with a backlight (now shown)) by signal transfer means shown in FIGS. 10 and 11. The graphic controller 102 principally comprises a CPU (or GCPU, central processing unit) 112 and a VRAM (video-RAM, image data storage memory) 114 and is in charge of management and communication of image data between a host CPU 113 and the liquid crystal display apparatus (FLCD) 101. The control of image display according to the present invention is principally accomplished by the graphic controller 102. Incidentally, a light source is disposed at the back of the display panel.

A smectic liquid crystal generally has a layer structure and, due to a shrinkage of spacing between layers when it causes a transition from smectic A phase (SmA) to chiral smectic C phase (SmC*), it assumes a chevron structure as shown in FIG. 4 where the layers 41 are bent at a mid point between a pair of substrates 44a and 44b.

There are two alignment states depending on the bending directions as shown in FIG. 4, including an C1 alignment state 42 appearing immediately after transition from a higher temperature phase to SmC* phase and a C2 alignment state 43 which appears in mixture with the C2 alignment state on further cooling. We have further discovered (1) that the above C114 C2 transition does not readily occur when a specific combination of an alignment film providing a high pretilt angle α and a liquid crystal is used, and the C2 alignment state does not occur at all when a specific liquid crystal is used, and (2) that, in C1 alignment state, two stable states providing a high contrast (hereinafter inclusively called "uniform state") are formed in addition to hitherto-found two stable states providing low contrast (hereinafter inclusively called "splay state") wherein liquid crystal directors are twisted between the substrates.

These states can be transformed from one to the other by applying a certain electric field. More specifically, transition between two splay states is caused under application of weak positive and negative pulse electric fields, and transition between two uniform states is caused under application of strong positive and negative pulse electric fields. By using the two uniform states, it is possible to realize a display device which is brighter and shows a higher contrast than the conventional devices. Accordingly, it is expected that a display with a higher quality can be realized by using a display device wherein the entire display area is formed in C1 alignment state and the high contrast two states in the C1 alignment state are used as two states representing white and black display states.

In order to realize C1 alignment state without yielding C2 alignment state as described above, the following conditions are required.

Figure 5A:
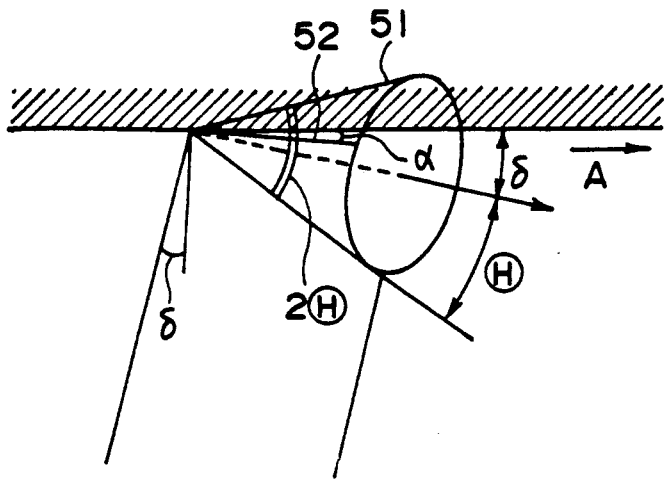
FIG. 5A and 5B are illustrations of relationship among a cone angle, a pretilt angle and a layer inclination angle in C1 alignment and C2 alignment; respectively.
Figure 5B:
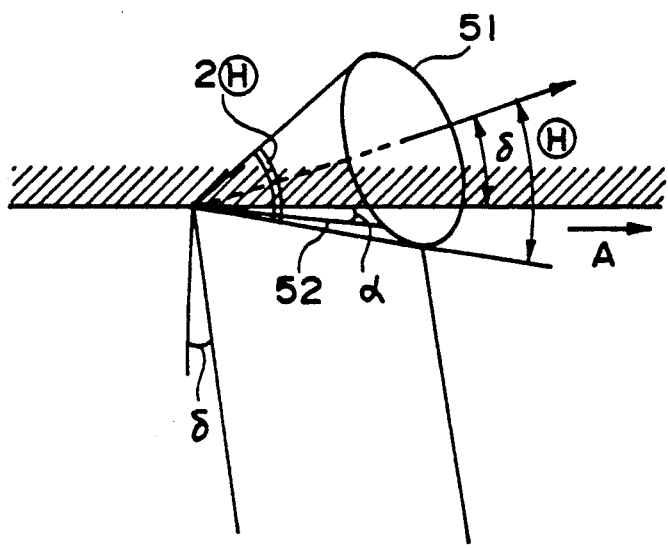

Referring to FIGS. 5A and 5B, directions in the vicinity of the substrates in the C1 alignment and C2 alignment are disposed on cones 51 shown in FIGS. 5A and 5B, respectively. As is well known, as a result of rubbing, liquid crystal molecules contacting a substrate surface form a pretilt angle $\alpha$, the direction of which is such that the liquid crystal molecules 52 raise a forward end up (i.e., spaced from the substrate surface) in the direction of the rubbing indicated by an arrow A (as shown also in FIG. 4). From the above, it is required that the following relationships are satisfied among a cone angle $H$, the pretilt angle $\alpha$ and a layer inclination angle $\delta$:

$H + \delta > \alpha$ in C1 alignment, and $H - \delta > \alpha$ in C2 alignment.

Accordingly, the condition for preventing the formation of C2 alignment but allowing C1 alignment is $H - \delta < \alpha$, that is $$H < \alpha + \delta \ldots \quad (I)$$

Further, from simple consideration of a troque acting on a liquid crystal molecule at a boundary surface in switching from one position to the other position under an electric field, the relationship of $\alpha < \delta \ldots$ (II) is given as a condition for easy switching of such a liquid crystal molecule at the boundary.

Accordingly, in order to form the C1 alignment more stably, it is effective to satisfy the condition (II) in addition to the condition (I).

From further experiments under the conditions of (I) and (II), the apparent tilt angle $\theta a$ is increased from 3-8 degrees obtained when the conditions (I) and (II) are not satisfied to 8-16 degrees when the conditions (I) and (II) are satisfied according to the present invention, and also an empirical relationship of $H > \theta a > H/2 \ldots$ (III) has been also found.

As described above, it has been clarified that the satisfaction of the conditions (I), (II) and (III) provides a display device capable of displaying a high-contrast image.

In order to stably form the C1 alignment state and also provide a good alignment characteristic, it is also very effective to perform cross-rubbing, that is, rubbing a pair of substrates in directions intersecting at an angle of 2-25 degrees while the directions A are shown generally parallel in FIG. 4. Alternatively, it is also possible to dispose the directions A generally opposite to each other.

Incidentally, a display apparatus using a chiral smectic liquid crystal can realize a large screen and a high resolution which by far exceed those attained by conventional CRT and TN-type liquid crystal displays. However, as the screen size and resolution are increased, the frame frequency (frequency constituting one picture) becomes low. This leads to a problem that the picture-rewriting speed becomes slow and the motion picture display becomes slow, e.g., in cases of smooth scrolling and cursor movement on a graphic screen. A solution to this problem has been given in, e.g., JP-A 60-31120 and JP-A 1-140198.

More specifically, there has been disclosed a display apparatus including a display panel comprising scanning electrodes and data electrodes arranged in a matrix, whole-area writing means for selecting all or a prescribed part of the scanning electrodes for writing and partial writing means for selecting a part of the above-mentioned all or a prescribed part of the scanning electrodes. As a result, a partial motion picture display can be performed at a high speed by the partial writing mode, and the partial writing and the whole-area writing can be performed compatibly.

As described above, it has become clear that it is possible to realize a large-area and high-resolution display which can display high-contrast images at a high speed by incorporating a liquid crystal device satisfying the conditions (I), (II) and (III) in the above-described display apparatus capable of performing the partial writing.

It has been generally known that the cone angle $H$ is 0 degree at a phase transition temperature Tc between smectic A phase and a chiral smectic C phase, and shows an abrupt change immediately below Tc and an increasing value as the temperature is lowered away from the phase transition temperature Tc. That is, the cone angle $H$ shows a larger value at a lower temperature.

On the other hand, the response speed tends to be slower at a larger cone angle $H$, and the temperature-dependence of response speed becomes larger at a larger temperature-dependence of cone angle $H$.

According to our study, it has been found that two similar liquid crystal compositions containing compounds which are identical to each other except for a slight difference in their chain length, can show substantially different temperature-dependences especially at a lower temperature side even when their viscosities and spontaneous polarizations are not substantially different. It has been also found that the above phenomenon is attributable to the difference in temperature-dependence of cone angle $H$. Accordingly, if a certain liquid crystal composition shows a tendency of decreasing its cone angle $H$ in response to a decrease in temperature particularly at a lower temperature side of generally causing a larger temperature-dependence of response speed unlike a conventional composition showing a monotonous increase of cone angle $H$ on temperature decrease, the liquid crystal composition is provided with a substantially improved temperature-dependence of response speed.

As briefly described above, we have found that the decrease in temperature-dependence of cone angle $H$ of liquid crystal composition is affected by factors, such as species, basic skeletons and side chain lengths of liquid crystal compounds contained therein, and combination and compositional ratio of such liquid crystal compounds. However, there have not been found absolute rules regarding the decrease in temperature-dependence. Anyway, among a large number of liquid crystal compositions prepared by blending liquid crystal compounds in various manners, there have been found some liquid crystal compositions showing a decreased temperature-dependence of one angle $H$ by selecting a type of liquid crystal composition which has a temperature range of chiral smectic C range including: a first temperature range where the liquid crystal composition shows a cone angle in chiral smectic C phase which increases on temperature decrease down to a mediate temperature, and a second temperature range, below the first temperature range, where the liquid crystal composition shows a cone angle in chiral smectic C phase which decreases on further temperature decrease below the mediate temperature. Further, we have also found a tendency that a type of liquid crystal composition containing an increased amount of a compound tending to provide a broader smectic A temperature range provides such first and second temperature ranges.

In a preferred embodiment of the present invention, a liquid crystal device showing a remarkably decreased temperature-dependence of response speed can be realized by using a liquid crystal composition showing such a mediate temperature in a temperature range of (Tc-10) °C. to 10° C., preferably (Tc-10) °C. to 20° C., particularly preferably (Tc-10) °C. to 30° C., wherein Tc denotes a phase transition temperature from smectic A phase to chiral smectic C phase. The temperature Tc should preferably be at a temperature of at least 60° C., more preferably at least 65° C.

In a preferred embodiment of the present invention, a high contrast image display is realized by using a liquid crystal device wherein a liquid crystal composition is placed in an alignment state of chiral smectic C phase such that the liquid crystal molecules are oriented to any one of the at least two optically stable states which form an angle $2\theta a$ therebetween ($\theta a$; tilt angle) in the absence of an electric field; the liquid crystal molecules are aligned to form a plurality of liquid crystal molecular layers of chiral smectic phase each comprising a plurality of molecules and being inclined at an inclination angle $\delta$ with respect to a normal to the substrates; the liquid crystal molecules are aligned at a pretilt angle $\alpha$ with respect to the substrates; wherein the angles $\theta a$, $H$, $\delta$ and $\alpha$ satisfy the relationships of: $H < \alpha + \delta$, $\delta < \alpha$, and $H > \theta a > H/2$.

Further, it is preferred that the cone angle $H$ satisfies 7 degrees $< H <$ 27 degrees and provides a maximum $H_{max}$ and a minimum $H_{min}$ satisfy a ratio $H_{max}/H_{min} < 1.5$ in the temperature range of 10°-50° C.

According to our further study, it has been found that two similar liquid crystal compositions containing compounds which are identical to each other except for a light difference in their chain length, can show substantially different temperature-dependence especially at a lower temperature side even when their viscosities and spontaneous polarizations are not substantially different. It has been also found that the above phenomenon is attributable to the difference in temperature-dependence of layer inclination angle $\delta$. Accordingly, if a certain liquid crystal composition shows a tendency of decreasing its inclination angle $\delta$ in response to a decrease in temperature particularly at a lower temperature side of generally causing a larger temperature-dependence of response speed unlike a conventional composition showing a monotonous increase of inclination angle $\delta$ on temperature decrease, the liquid crystal composition is provided with a substantially improved temperature-dependence of response speed.

As described above, we have found that the decrease in temperature-dependence of inclination angle $\delta$ of a liquid crystal composition is affected by factors, such as species, basic skeletons and side chain lengths of liquid crystal compounds contained therein, and combination and compositional ratio of such liquid crystal compounds. However, there have not been found absolute rules regarding the decrease in temperature-dependence. Anyway, among a large number of liquid crystal compositions prepared by blending liquid crystal compounds in various manners, there have been found some liquid crystal compositions showing a decreased temperature-dependence of inclination angle $\delta$ by selecting a type of liquid crystal composition which has a temperature range of chiral smectic C range including: a first temperature range where the liquid crystal composition shows an inclination angle $\delta$ in chiral smectic C phase which increases on temperature decrease down to a mediate temperature, and a second temperature range, below the first temperature range, where the liquid crystal composition shows an inclination angle $\delta$ in chiral smectic C phase which decreases on further temperature decrease below the mediate temperature. Further, we have also found a tendency that a type of liquid crystal composition containing an increased amount of a compound tending to provide a broader smectic A temperature range provides such first and second temperature ranges.

In a preferred embodiment of the present invention, a liquid crystal device showing a remarkably decreased temperature-dependence of response speed can be realized by using a liquid crystal composition showing such a mediate temperature at a temperature of at least 10° C., preferably at least 25° C. as a temperature giving $\delta_{max}$ (i.e., a maximum of inclination angle $\delta$).

It is preferred that $\delta_{max}$ is at most 20 degrees, more preferably at most 15 degrees, so as to increase the picture-rewriting speed (frame frequency) of a display device.

As another characteristic of a liquid crystal composition for improving the above-mentioned temperature-dependence of response speed, it is preferred that the magnitude of the spontaneous polarization Ps increases on temperature decrease and does not show a tendency of decrease even below the temperature giving the $\delta_{max}$.

FIG. 8 illustrates an alignment state of a liquid crystal molecular layer 82 in chiral smectic C phase disposed between a pair of substrates 81a and 81b each provided with a rubbing axis A, wherein the molecular layer 82 composed of plural liquid crystal molecules 83 is bent or non-planar and inclined with respect to the substrates at an inclination angle $\delta$, thus forming a chevron structure. FIG. 9 illustrates an alignment state in smectic A phase wherein each molecular layer 84 composed of plural liquid crystal molecules 85 is aligned in a shape different from the molecular layer 81 in chiral smectic C phase shown in FIG. 8. The degree of deformation of the molecular layer from the smectic A phase (layer 84) to the chiral smectic C phase (layer 82) generally changes corresponding to the above-mentioned change in inclination angle δ.

It has been described above that a display providing high-contrast images can be realized by using a liquid crystal device utilizing C1 uniform alignment by satisfying the above-mentioned conditions (I), (II) and (III). It has been however found that such a liquid crystal device satisfying the conditions can show a remarkably long persistence time in some cases such that a previous image pattern can be recognized 10 sec or more. This phenomenon is particularly pronounced at a temperature below room temperature. The mechanism of the persistence or afterimage has not been clarified as yet but may be attributable to the following phenomena.

In case where a liquid crystal device using a chiral smectic liquid crystal is actually used as a display panel, there are formed insulating films including an alignment film of, e.g., polyimide and an insulating film for short-circuit prevention disposed between the liquid crystal layer and matrix electrodes formed on a pair of substrates. Because of such insulating films, when the liquid crystal is supplied with a voltage of one polarity for switching from a first optically stable state (e.g., a white display state) to a second optically stable state (e.g., a black display state) and then the voltage of one polarity is removed, the ferroelectric liquid crystal layer is supplied with a reverse electric field Vrev of the opposite polarity. The reverse electric field Vrev causes the following two phenomena leading to the persistence during display. (The generation of the above-mentioned reverse electric field has been reported in "Switching Characteristic of SSFLC" by Ako Yoshida, "Preprint for Liquid Crystal Forum, October 1987", p.p. 142–143).

(1) Presence of yet-un-inverted minute region

In a chiral smectic liquid crystal display in general, there are formed minute projections at pixels, including spacer beads for retaining the cell gap, stepwise differences between pixels and stepwise differences due to metal wires for decreasing the electrode resistance. At such projections in a pixel, there remain minute regions of not causing complete inversion and, at slight regions surrounding the minute regions, switching of, e.g., from white to black, is retarded than in the other regions free from such projections in some cases, thus causing a time lag before reaching the stable state which may be presumably attributable to a time for attenuation of the generated reverse electric field.

(2) Presence of apparent tilt angle stabilization time during drive

Compared with a pixel continually placed in one display state, a pixel immediately after switching from another display state into such one display state is accompanied with a slight deviation of the average liquid crystal molecule position toward the normal to liquid crystal molecular layer, that is, a slightly smaller apparent tilt angle. This is confirmed as a delay time until reaching a stable optical level when the optical response is monitored. The delay time is also considered to be attributable to the time for attenuation of the reverse electric field.

Due to the above two phenomena, a pixel immediately after switching from, e.g., white to black, is caused to have a slightly different brightness level compared with a pixel placed in the black state for a long time. That is, the pixel is first recognized as a somewhat thinner black and then recognized to have a uniform black level with time. In some cases, the persistence can be recognized for several to several tens of seconds.

These phenomena are more pronounced at a lower temperature region requiring a longer time for attenuation of the generated reverse electric field.

As a result of our further study and experiments, for solving the problem of persistence still occurring at low temperatures in a liquid crystal device satisfying the above-mentioned conditions (I), (II) and (III), we have noted the presence of a correlation with a layer inclination angle of a liquid crystal composition. Thus, by appropriate selection of a liquid crystal composition depending on the temperature-dependence of layer inclination, it has been found possible to constitute a liquid crystal device which is free from worsening of the persistence at low temperatures and accompanied with only a small temperature-dependence of drive conditions.

More specifically, a liquid crystal device with little persistence and improved display characteristics at low temperatures can be realized by using a liquid crystal composition showing a layer inclination angle δ in smectic phase which increases on temperature decrease and then, below a certain mediate temperature, decreases on further temperature decrease, compared with a liquid crystal device using a liquid crystal composition not showing such temperature characteristic.

The layer inclination angle δ generally shows zero at the SmA→SmC* phase transition temperature and increases on further temperature decrease. A larger layer inclination angle δ provides a smaller net component in the direction of a normal to the substrates of the spontaneous polarization director and therefore results in a decrease in interaction with an external electric field, thus adversely affecting the switching speed and resulting in generally worse driving characteristics, such as fluctuation of a molecule on a cone under application of non-selective signal waveform (small-amplitude AC signals below threshold) during actual drive. If a liquid crystal composition shows a layer inclination angle δ which decreases with temperature decrease on a low temperature side where the degree of persistence and the temperature-dependence of response speed tend to be intense, the liquid crystal composition can provide remarkable improvements in persistence and temperature-dependence of response speed at low temperatures compared with a conventional liquid crystal composition showing a monotonous increase in inclination angle with temperature increase.

Figure 24:
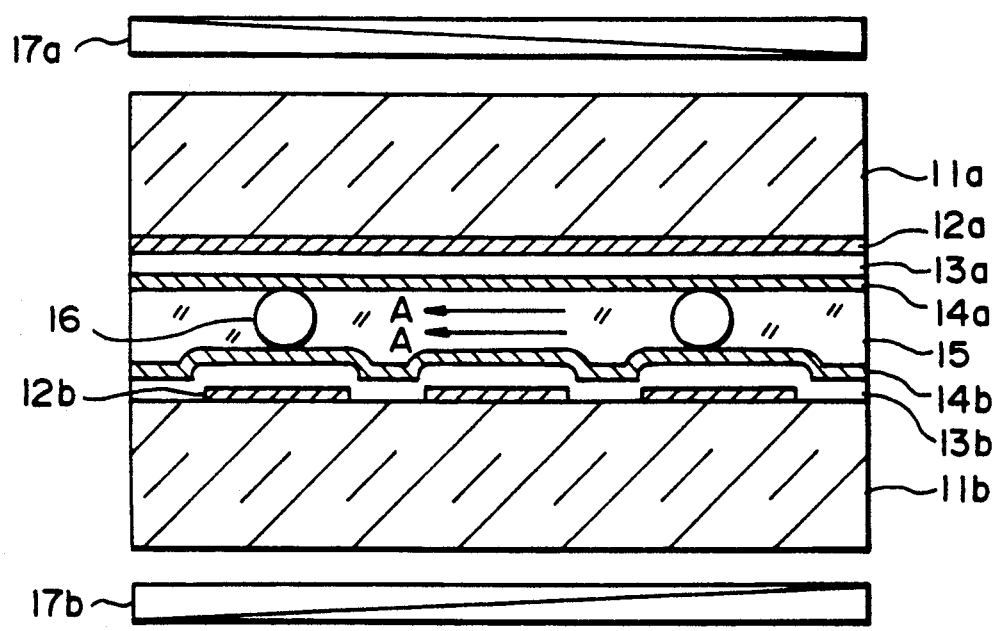
FIG. 24 is a schematic sectional view of another embodiment of the liquid crystal device according to the present invention.

A preferred embodiment of the liquid crystal device will now be described with reference to FIG. 24 which is a schematic sectional view of the device. Referring to FIG. 24, the device includes a pair of substrates (glass plates) 11a and 11b coated with transparent electrodes 12a and 12b, respectively, of $In_2O_3$, ITO (indium tin oxide), etc., then with 200 to 3000 Å-thick insulating films 13a and 13b, respectively, of $SiO_2$, $TiO_2$, $Ta_2O_5$, etc., and further with 50 to 1000 Å-thick polyimide alignment films 14a and 14b formed, e.g., by applying and baking a polyamide acid represented by the following formula:

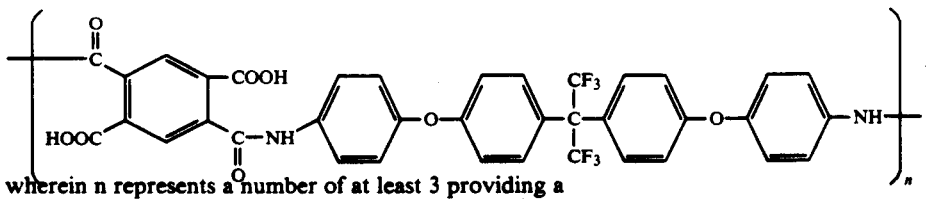

wherein n represents a number of at least 3 providing a number-average molecular weight of $10^4$ to $10^6$ as measured as corresponding to standard polystyrene by gel permeation chromatography. The alignment films 14a and 14b are respectively provided with uniaxial alignment axes by rubbing in directions (denoted by arrows A in FIG. 24) which are generally parallel and in the same direction but intersect each other at a clockwise or counter-clockwise angle of 0-20 degrees. The direction of clockwise (or counter-clockwise) intersection angle is determined herein by the direction of rotation of the alignment axis provided to the upper alignment film 14a from the alignment axis provided to the lower alignment film 14b as viewed from the upper substrate 11a.

Between the substrates 11a and 11b is disposed a chiral smectic C liquid crystal 15, and the spacing between the substrates 11a and 11b is set to a value (e.g., 0.1-3 μm) which is sufficiently small to suppress the formation of a helical structure of the chiral smectic C liquid crystal 15, thus resulting in bistable alignment states of the liquid crystal 15. The small spacing is held by spacer beads 16 of, e.g., silica or alumina, dispersed between the substrates. The thus-formed cell structure is sandwiched between a pair of polarizers 17a and 17b to provide a liquid crystal device.

A simple matrix-type display apparatus using a liquid crystal device comprising a ferroelectric liquid crystal disposed between a pair of substrates as described above may be driven by driving methods as disclosed by, e.g, JP-A 59-193426, JP-A 59-193427, JP-A 60-156046 and JP-A 60-156047.

Figure 6:
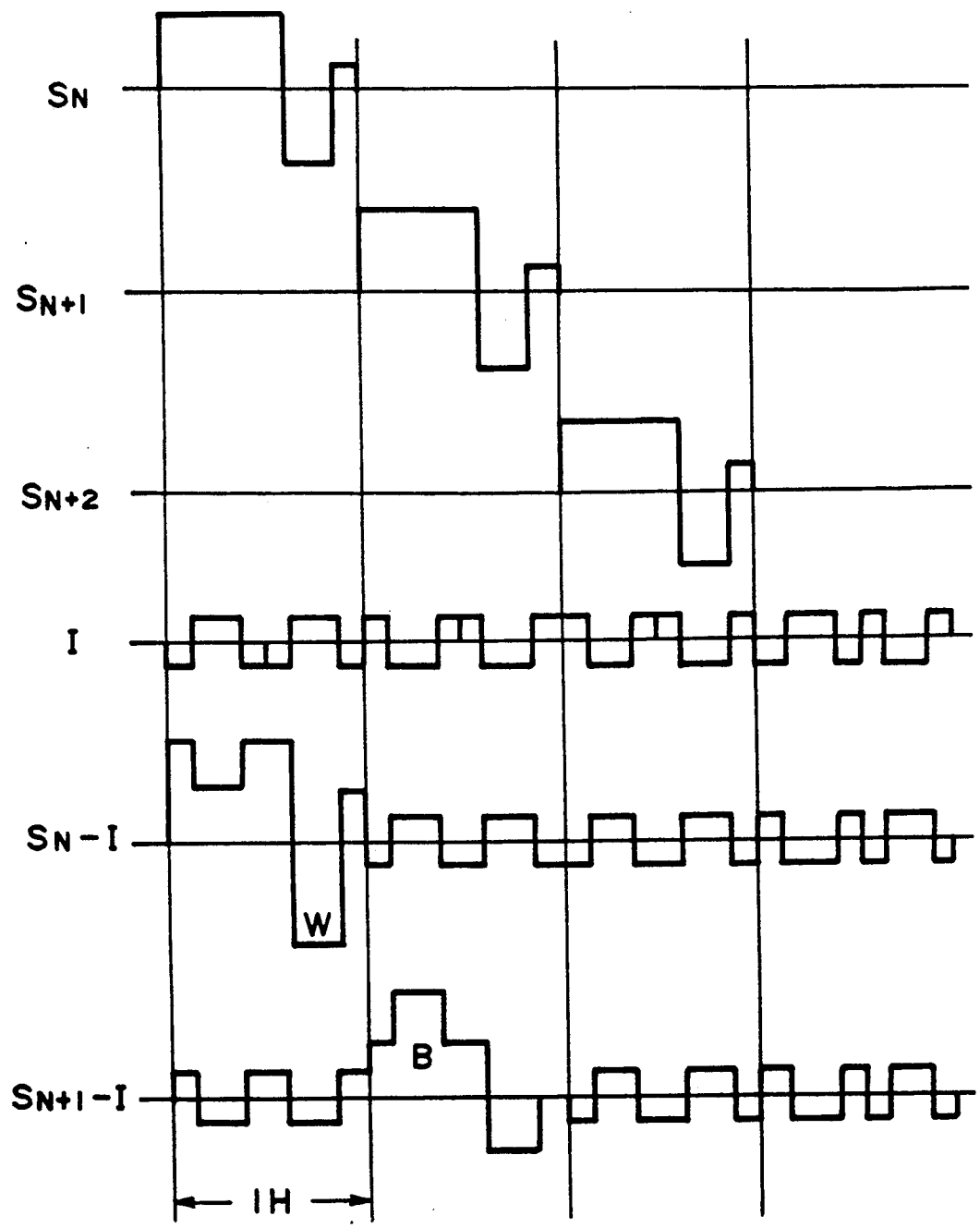
FIG. 6 is a waveform diagram illustrating driving waveforms used in an embodiment of the present invention.
Figure 7:
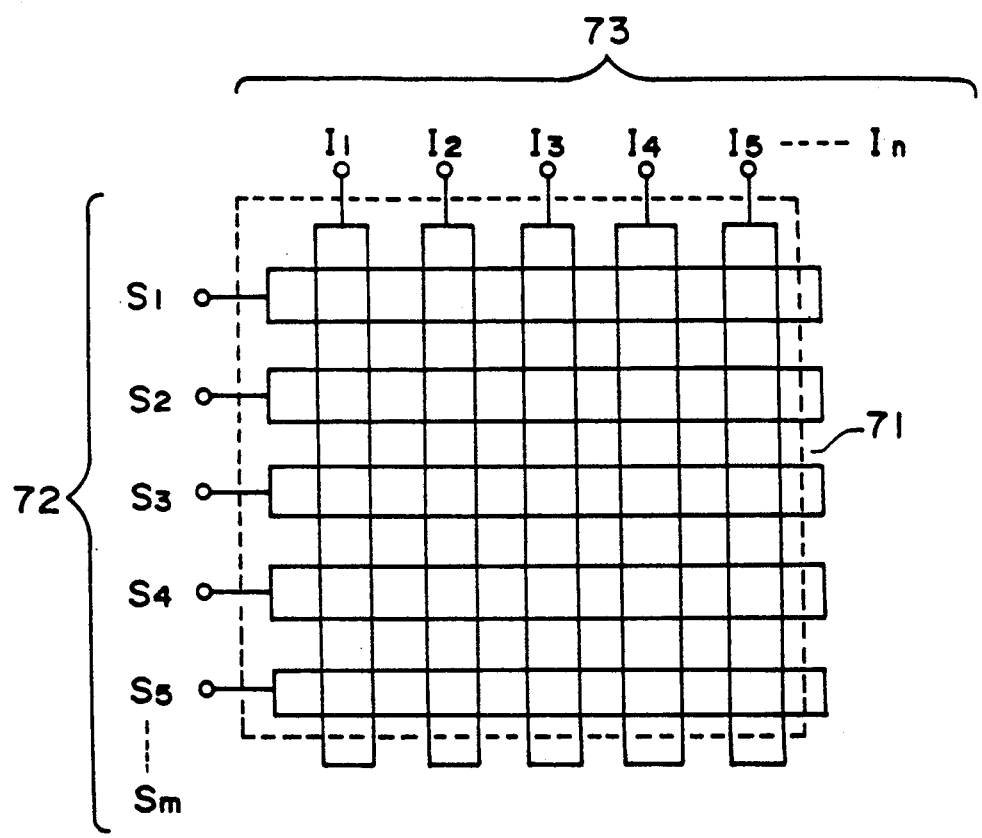
FIG. 7 is a plan view of an electrode matrix.

FIG. 6 is a waveform diagram showing an example set of driving waveforms used in such a driving method. FIG. 7 is a plan view showing an electrode matrix used in a ferroelectric liquid crystal panel 71 of a simple matrix-type. The liquid crystal panel 71 shown in FIG. 7 includes scanning electrodes 72 and data electrodes 73 intersecting each other so as to constitute a pixel at each intersection together with a ferroelectric liquid crystal disposed between the scanning electrodes 72 and data electrodes 73.

Figure 21A:
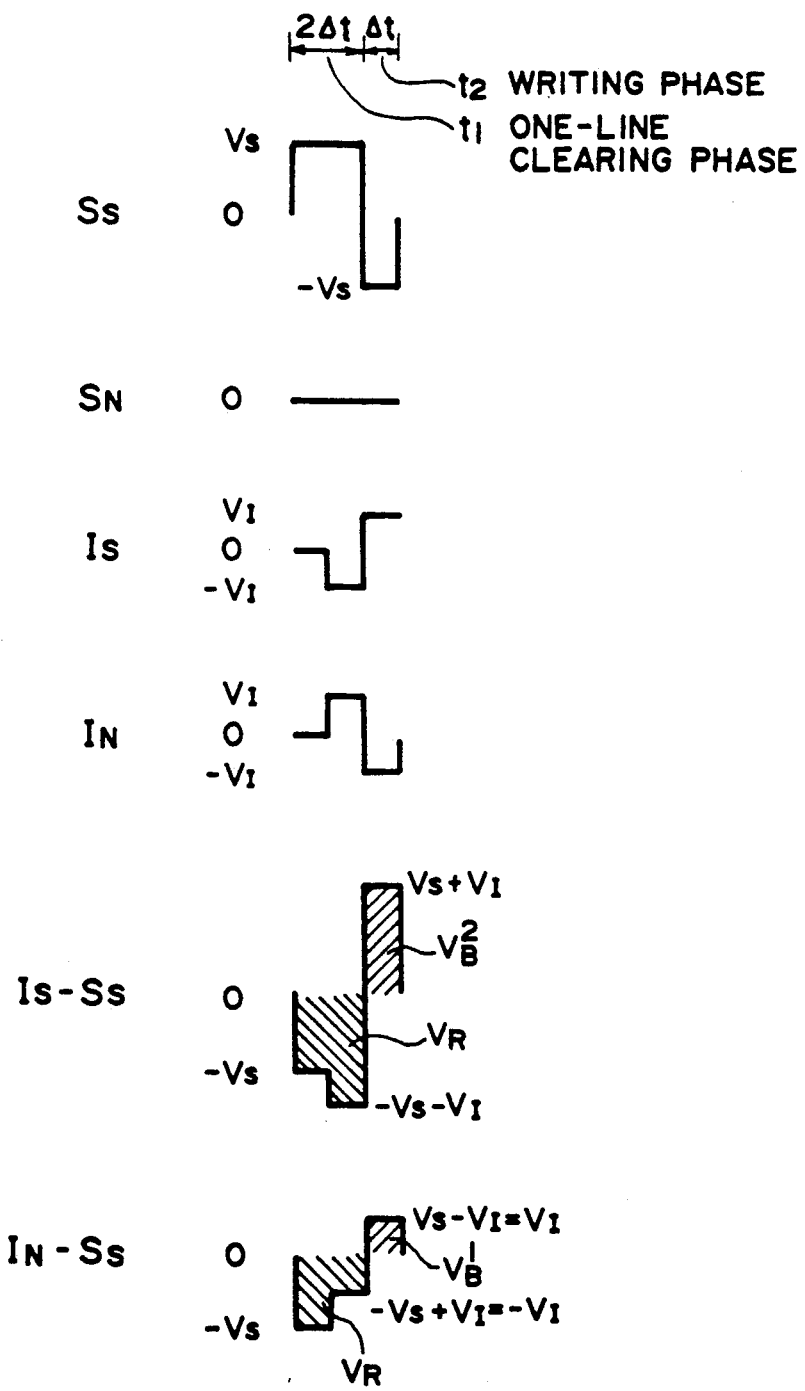
FIG. 21A shows unit driving waveforms used in an embodiment of the present invention and FIG. 21B is time-serial waveforms comprising a succession of such unit waveforms.
Figure 21B:
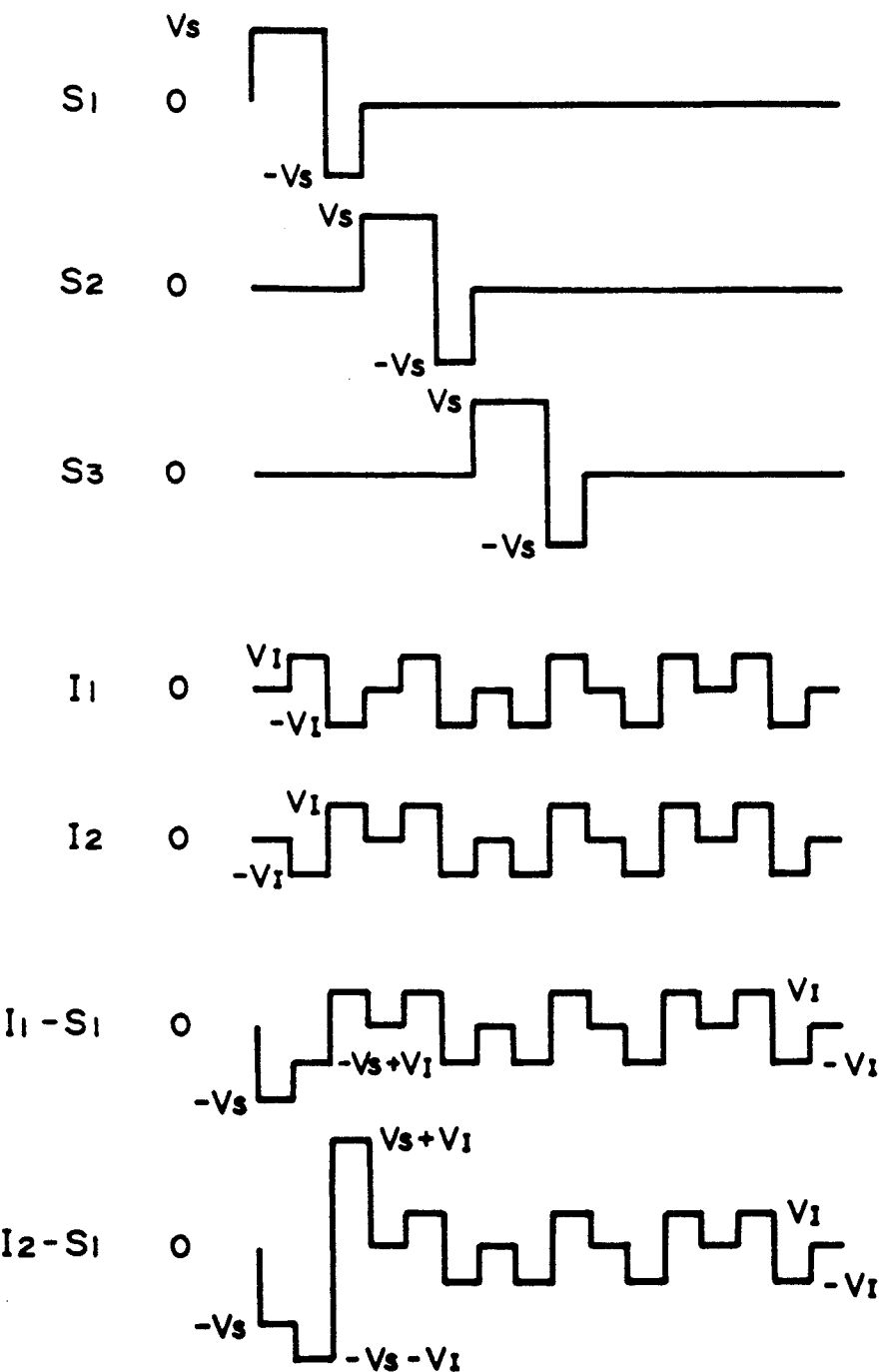

FIGS. 21A and 21B illustrate another example set of driving voltage waveforms.

Referring to FIG. 21A, at $S_S$ is shown a selection scanning signal waveform applied to a selected scanning line, at $S_N$ is shown a non-selection scanning signal waveform applied to a non-selected scanning line, at $I_S$ is shown a selection data signal waveform (providing a black display state) applied to a selected data line, and at $I_N$ is shown a non-selection data signal waveform applied to a non-selected data line. Further, at $I_S-S_S$ and $I_N-S_S$ in the figure are shown voltage waveforms applied to pixels on a selected scanning line, whereby a pixel supplied with the voltage $I_S-S_S$ assumes a black display state and a pixel supplied with the voltage $I_N-S_S$ assumes a white display state. FIG. 21B shows a time-serial waveform used for providing a display state as shown in FIG. 22.

In the driving embodiment shown in FIGS. 21A and 21B, a minimum duration $\Delta t$ of a single polarity voltage applied to a pixel on a selected scanning line corresponds to the period of a writing phase $t_2$, and the period of a one-line clearing phase $t_1$ is set to $2\Delta t$.

The parameters $V_S$, $V_I$ and $\Delta t$ in the driving waveforms shown in FIGS. 21A and 21B are determined depending on switching characteristics of a ferroelectric liquid crystal material used.

FIG. 23 shows a V−T characteristic, i.e., a change in transmittance T when a driving voltage denoted by $V_S+V_I$) is changed while a bias ratio as mentioned hereinbelow is kept constant. In this embodiment, the parameters are fixed at constant values of $\Delta t = 50$ μs and a bias ratio $V_I/(V_I+V_S) = \frac{1}{4}$. On the right side of FIG. 23 is shown a result when the voltage ($I_N-S_S$) shown in FIG. 21 is applied to a pixel concerned, and on the left side of FIG. 23 is shown a result when the voltage ($I_S-S_S$) is applied to a pixel concerned, respectively while increasing the voltage ($V_S+V_I$). On both sides of the abscissa, the absolute value of the voltage ($V_S+V_I$) is separately indicated. Herein, a voltage $V_1$ denotes the absolute value of ($V_S+V_I$) required for switching from a white state to a black state by applying a voltage signal $V_{B2}$ shown in FIG. 21A, a voltage $V_2$ denotes the absolute value of ($V_S+V_I$) required for switching (re-setting) a black state to a white state by applying a voltage $V_R$ at $I_N-S_S$, and a voltage $V_3$ is the value of ($V_S+V_I$) beyond which a pixel concerned written in white is unexpectedly inverted into a black state by applying a voltage $V_{B'}$ at $I_n-S_S$ in FIG. 21A. In this instance, a relationship of $V_2 < V_1 < V_3$ holds. The voltage $V_1$ may be referred to as a threshold voltage in actual drive and the voltage $V_3$ may be referred to as a crosstalk voltage. Such a crosstalk voltage $V_3$ is generally present in actual matrix drive of a ferroelectric liquid crystal device. In an actual drive, $\Delta V = (V_3 - V_1)$ provides a range of $|V_S+V_I|$ allowing a matrix drive and may be referred to as a (driving) voltage margin, which is preferably large enough. It is of course possible to increase the value of $V_3$ and thus $\Delta V$ $(=V_3-V_1)$ by increasing the bias ratio (i.e., by causing the bias ratio to approach a unity). However, a large bias ratio corresponds to a large amplitude of a data signal and leads to an increase in flickering and a lower contrast, thus being undesirable in respect of image quality. According to our study, a bias ratio of about $\frac{1}{3}-\frac{1}{4}$ was practical. On the other hand, when the bias ratio is fixed, the voltage margin $\Delta V$ strongly depends on the switching characteristics of a liquid crystal material used, and it is needless to say that a liquid crystal material providing a large $\Delta V$ is very advantageous for matrix drive.

The upper and lower limits of application voltages and a difference therebetween (driving voltage margin $\Delta V$) by which selected pixels are written in two states of "black" and "white" and non-selected pixels can retain the written "black" and "white" states at a constant temperature as described above, vary depending on and are inherent to a particular liquid crystal material used. Further, the driving margin is deviated according to a change in environmental temperature, so that optimum driving voltages should be set in an actual display apparatus according to a liquid crystal material used and an environmental temperature.

In a practical use, however, when the display area of a matrix display apparatus is enlarged, the differences in environmental conditions (such as temperature and cell gap between opposite electrodes) naturally increase, so that is becomes impossible to obtain a good quality of image over the entire display area by using a liquid crystal material having a small driving voltage margin.

The values of cone angle $\widehat{H}$, liquid crystal layer inclination angle $\delta$, pretilt angle $\alpha$ and apparent tilt angle $\theta a$ referred to herein are based on values measured according to the following methods.

Measurement of cone angle $\widehat{H}$

An FLC (ferroelectric liquid crystal) device was sandwiched between right angle-cross nicol polarizers and rotated horizontally relative to the polarizers under application of an AC voltage of ±30V to ±50V and 100 Hz between the upper and lower substrates of the device while measuring a transmittance through the device of a photomultiplier (available from Hamamatsu Photonics K.K.) to find a first extinct position (a position providing the lowest transmittance) and a second extinct position. A cone angle $\widehat{H}$ was measured as a half of the angle between the first and second extinct positions.

Measurement of apparent tilt angle $\theta a$

An FLC device sandwiched between right angle cross nicol polarizes was supplied with a single pulse of one polarity exceeding the threshold voltage of the ferroelectric liquid crystal and was then rotated under no electric field horizontally relative to the polarizers to find a first extinction position. Then, the FLC device was supplied with a single pulse of the opposite polarity exceeding the threshold voltage of the ferroelectric liquid crystal and was then rotated under no electric field relative to the polarizers to find a second extinct position. An apparent tilt angle $\theta a$ was measured as a half of the angle between the first and second extinct positions.

Measurement of liquid crystal layer inclination angle $\delta$

The method used was basically similar to the method used by Clark and Largerwal (Japanese Display '86, Sep. 30-Oct. 2, 1986, p.p. 456-458) or the method of Ohuchi et al (J.J.A.P., 27 (5) (1988), p.p. 725-728). The measurement was performed by using a rotary cathode-type X-ray diffraction apparatus (available from MAC Science), and 80 μm-thick microsheets (available from Corning Glass Works) were used as the substrates so as to minimize the X-ray absorption with the glass substrates of the liquid crystal cells.

Measurement of pretilt angle $\alpha$

The measurement was performed according to the crystal rotation method as described at Jpn. J. Appl. Phys. vol. 19 (1980), No. 10, Short Notes 2013.

More specifically, a pair of substrates rubbed in mutually parallel and opposite directions were applied to each other to form a cell having a cell gap of 20 μm, which was then filled with a liquid crystal mixture assuming SmA phase in the temperature range of 10°-55° C. obtained by mixing 80 wt. % of a ferroelectric liquid crystal ("CS-1014", mfd, by Chisso K.K.) with 20 wt. % of a compound represented by the following formula:

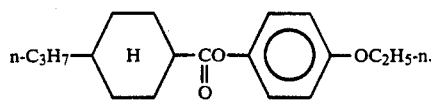

For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

An angle $\phi_x$ between a normal to the cell and the incident beam direction for providing the central point of a family of hyperbolic curves in the interference figure thus obtained was substituted in the following equation to find a pretilt angle $\alpha_o$, $$\sin 2\alpha_o = \frac{-2\sin\phi_x}{(n_o + n_e)\sqrt{1 - (\sin\phi_x/n_o)^2}}$$

wherein $n_o$ denotes the refractive index of ordinary ray, and $n_e$ denotes the refractive index of extraordinary ray.

Hereinbelow, the present invention will be described more specifically based on Examples to which the present invention is not intended to be limited, however. In the Examples, "part(s)" used for describing compositions are all by weight.

EXAMPLE 1

The following liquid crystal compositions 1-B and 1-A were prepared.

| 1-B | |
|---|---|
| $C_6H_{13}$—[pyrimidine]—[phenyl]—$OC_{12}H_{25}$ | 12.0 parts |
| $C_8H_{17}$—[pyrimidine]—[phenyl]—$OC_9H_{19}$ | 18.0 parts |
| $C_8H_{17}$—[pyrimidine]—[phenyl]—$O_{10}H_{21}$ | 30.0 parts |
| $C_6H_{13}$—[benzothiazole]—[phenyl]—$OC_8H_{17}$ | 25.0 parts |
| $C_5H_{11}$—[phenyl]—[thiadiazole]—[phenyl]—$C_5H_{11}$ | 7.0 parts |

-continued

C$_8$H$_{17}$—⟨ring⟩—C(S)=N—N=C(S)—⟨ring⟩—C$_8$H$_{17}$  3.0 parts

C$_{12}$H$_{25}$—⟨ring-N=N⟩—⟨ring⟩—OC(O)—CH=C(S)—C$_6$H$_{13}$  10.0 parts

C$_{11}$H$_{23}$—⟨ring-N=N⟩—⟨ring-F⟩—OC(O)—CH=C(S)—C$_4$H$_9$  5.0 parts

C$_{10}$H$_{21}$—⟨ring-N=N⟩—⟨ring⟩—OCH$_2$CHC$_6$H$_{13}$(F)  10.0 parts

1-A

1-B  85 parts

C$_8$H$_{17}$—⟨ring⟩—C(S)=N—CH=CH—⟨ring⟩—C$_{10}$H$_{21}$  10 parts

C$_{10}$H$_{21}$—⟨ring⟩—C(S)=N—CH=CH—⟨ring⟩—C$_{10}$H$_{21}$  5 parts

The phase transition temperatures (°C.) of the liquid crystal compositions 1-A and 1-B thus obtained are respectively shown in the following Table 1.

TABLE 1

| Liquid Crystal | Phase transition temperature (°C.) | | | | |
|---|---|---|---|---|---|
| | Cry | Sc* | SA | Ch | Iso |
| 1-A | ←−15.8 −8.7→ | ←70.5 | ←86.3 | ←91.2 | |
| 1-B | ←−15.1 9.8→ | ←69.5 | ←77.4 | ←86.5 | |

The cone angles Ⓗ of the compositions measured at various temperatures according to the method described hereinbelow are shown below.

TABLE 2

| | Cone angle Ⓗ (degree) | | | | | | | |
|---|---|---|---|---|---|---|---|---|
| | Temp. (°C.) | | | | | | | |
| LC | 10 | 20 | 30 | 40 | 45 | 50 | 55 | 60 |
| 1-A | 14.1° | 15.9° | 16.5° | 16.8° | — | 16.4° | — | 13.9° |
| 1-B | 23.8° | 23.2° | 22.8° | 21.7° | — | 20.3° | — | 18.2° |

Then, the respective compositions were used for preparing liquid crystal devices as follows.

Two 0.7 mm-thick glass plates were provided and respectively coated with an ITO film to form an electrode for voltage application, which was further coated with an insulating layer of vapor-deposited SiO$_2$. The insulating layer was further coated with a 0.2% isopropyl alcohol solution of silane coupling agent ("KBH-602" available from Shin Etsu Kagaku K.K.) by spin coating at 2000 r.p.m. for 15 sec., followed by drying at 120° C. for 20 min. The glass plate thus treated was further coated with a 1.5%-solution of polyimide resin precursor (SP-510, available from Toray K.K.) in dimethylacetoamide by a spinner coater rotating at 2000 rpm for 15 seconds. Thereafter, the coating film was subjected to heat curing at 300° C. for 60 min. to obtain about 250 Å-thick film.

The coating film was rubbed with acetate fiber-planted cloth. The thus treated two glass plates were washed with isopropyl alcohol. After silica beads with an average particle size of 2.0 μm were dispersed on one of the glass plates, the two glass plates were applied to each other with a bonding sealing agent ("Lixon Bond", available from Chisso K.K.) so that their rubbed directions were parallel to each other and heated at 100° C. for 60 min. to form a blank cell. The cell gap was found to be about 2.0 μm as measured by a Berek compensator.

Then, each of the above-prepared liquid crystal composition 1A and 1B was heated into an isotropic liquid, and injected into the above prepared cell under vacuum and, after sealing, was gradually cooled at a rate of 20° C./hour to 25° C. to prepare a ferroelectric liquid crystal device.

The two ferroelectric liquid crystal devices thus prepared were respectively subjected to measurement of a response time by applying a peak-to-peak voltage Vpp of 20 volts to measure a time $t^{e/ec}$ from voltage application to a peak of inversion current (current response time which generally corresponds to optical response time). The results are shown below.:

TABLE 3

| | Response characteristic | | | | Temp. factor |
|---|---|---|---|---|---|
| | Response time (μsec) | | | | |
| L.C. | 10° C. | 20° C. | 30° C. | 40° C. | $f^{10/40}$ |
| 1-A | 202 | 149 | 120 | 92 | 2.20 |
| 1-B | 474 | 240 | 131 | 82 | 5.78 |

Temp. factor $f^{10/40}$ means a ratio of response time at 10° C./response time at 40° c.

As is clear from the above results, the liquid crystal composition 1-A having a maximum of cone angle Ⓗ with temperature change showed a clearly smaller temperature-dependence of response speed than the base composition 1-B not showing such a maximum of cone angle Ⓗ.

EXAMPLES 2-3 AND COMPARATIVE EXAMPLES 2-3

Compositions 2-A, 2-B, 3-A to 3-E having different cone angle characteristics were prepared by mixing compounds listed in the following Table A, wherein R$_1$-R$_{12}$ respectively denote a normal alkyl group capable of having different numbers of carbon atoms and the numbers connected by / represent a pair of carbon numbers contained in a compound. For example, 8/10 (for R$_1$/R$_2$) appearing at the column of composition 2-A and used for constituting composition 2-A stands for the following compound.

TABLE A n-C$_8$H$_{17}$—[pyridine-N,N]—[phenyl]—OC$_{10}$H$_{21}$-n

| | Example 2 | | Example 3 | | | | |
|---|---|---|---|---|---|---|---|
| | 2-A | 2-B | 3-A | 3-B | 3-C | 3-D | 3-E |
| R$_1$—[pyridine]—[phenyl]—OR$_2$ <br> R$_1$/R$_2$ | 8/10 <br> 10/8 <br> 9/6 <br> 6/10 <br> 7/9 <br> 8/6 | 8/9 <br> 7/9 <br> 8/6 | 8/10 <br> 10/8 <br> 6/10 <br> 8/6 | 8/10 <br> 10/8 <br> 6/10 <br> 8/6 | 8/10 <br> 10/8 <br> 6/10 <br> 8/6 | 6/10 <br> 8/10 <br> 10/6 | 6/12 <br> 8/9 <br> 8/10 <br> 9/8 |
| R$_3$—[pyridine]—[phenyl]—[phenyl]—R$_4$ <br> R$_3$/R$_4$ | 7/7 <br> 7/5 | 7/7 <br> 7/5 | 7/7 <br> 7/5 | 7/7 <br> 7/5 | 7/7 <br> 7/5 | 7/7 <br> 7/5 | 7/7 <br> 7/5 |
| R$_5$—[phenyl]—[thiazole]—[phenyl]—OCR$_6$(=O) <br> R$_5$/R$_6$ | 6/6 | 6/6 | 6/6 | 6/6 <br> 6/8 | 6/6 | 6/6 | — |
| R$_7$—[benzothiazole]—[phenyl]—OR$_8$ <br> R$_7$/R$_8$ | 6/8 | 6/8 | 6/8 | — | 6/8 | 6/8 | 6/8 |
| R$_9$—[pyridine]—[phenyl]—OC(=O)—[thiophene]—R$_{10}$ <br> R$_9$/R$_{10}$ | 11/4 | — | 11/4 | 12/4 | 6/6 | — | 11/4 |
| R$_{11}$—[phenyl]—[thiazole]—[phenyl]—R$_{12}$ <br> R$_{11}$/R$_{12}$ | 6/9 | — | 6/9 | 6/9 | 6/9 | 6/9 <br> 6/6 | — |

EXAMPLE 2

The liquid crystal composition 2-A showed the phase transition temperatures (T$_{PT}$) and spontaneous polarization at 30° C. (Ps (30° C.)) as follows.

TABLE 4

| L.C. | T$_{PT}$(°C.) | | | | | Ps(30° C.) nC/cm$^2$ |
|---|---|---|---|---|---|---|
| | Cry | Sc* | SA | Ch | Iso | |
| 2-A | ←−13.2— −9.5→ | | ←68.1 | ←87.1 | ←93.4 | 5.7 |

Figure 13:
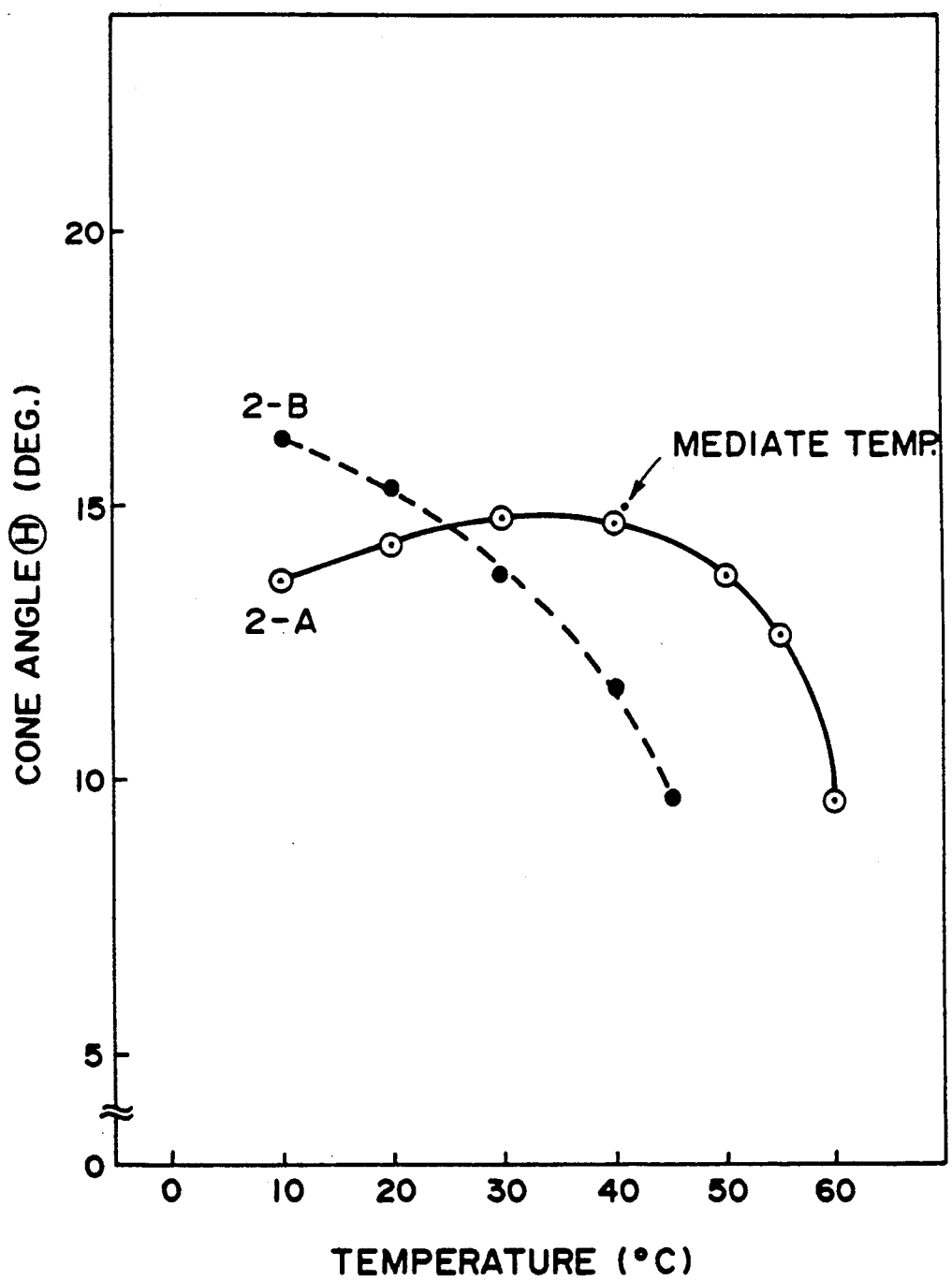

The composition 2-A showed the temperature dependence of cover angle (H) as shown below and in FIG. 13.

TABLE 5

| | Cone angle (degrees) | | | | | | | |
|---|---|---|---|---|---|---|---|---|
| | Temperature (°C.) | | | | | | | |
| L.C. | 10 | 20 | 30 | 40 | 45 | 50 | 55 | 60 |
| 2-A | 13.6 | 14.3 | 13.8 | 14.7 | — | 13.7 | 12.5 | 9.7 |

A ferroelectric liquid crystal device prepared by using the composition 2-A otherwise in the same manner as in Example 1 showed the following response characteristic.

TABLE 6

| | Response time (μsec) | | | | Temp. factor |
|---|---|---|---|---|---|
| L.C. | 10° C. | 20° C. | 30° C. | 40° C. | f$^{10/40}$ |
| 2-A | 154 | 104 | 74 | 60 | 2.57 |

COMPARATIVE EXAMPLE 2

The liquid crystal composition 2-B showed the phase transition temperatures ($T_{PT}$) and spontaneous polarization at 30° C. ($P_s$ (30° C.)) as follows.

TABLE 7

| L.C. | $T_{PT}$(°C.) Cry | Sc* | SA | Ch | Iso | Ps(30° C.) nC/cm² |
|---|---|---|---|---|---|---|
| 2-B | $\xrightarrow{-4.7}$ $\xleftarrow{-13.2}$ | $\xleftarrow{55.4}$ | $\xleftarrow{78.7}$ | $\xleftarrow{85.1}$ | | 5.8 |

The composition 2-B showed the temperature dependence of cover angle Ⓗ as shown below and in FIG. 13.

TABLE 8

| | Cone angle (degrees) Temperature (°C.) | | | | | | | |
|---|---|---|---|---|---|---|---|---|
| L.C. | 10 | 20 | 30 | 40 | 45 | 50 | 55 | 60 |
| 2-B | 16.2 | 15.3 | 13.7 | 11.7 | 9.7 | — | — | — |

A ferroelectric liquid crystal device prepared using the composition 2-B otherwise in the same manner as in Example 1 showed the following response characteristic.

TABLE 9

| | Response time (μsec) | | | | Temp. factor |
|---|---|---|---|---|---|
| L.C. | 10° C. | 20° C. | 30° C. | 40° C. | $f^{10/40}$ |
| 2-B | 172 | 104 | 60 | 42 | 4.10 |

As is clear from the composition between Example 2 and Comparative Example 2, the liquid crystal composition 2-A showing a mediate temperature with respect to cone angle Ⓗ showed a remarkably smaller temperature-dependence of response speed than the liquid crystal composition 2-B not showing such a mediate temperature.

EXAMPLE 3

The above-mentioned liquid crystal compositions 3-A, 3-B and 3-C showed the following phase transition temperatures ($T_{PT}$) and spontaneous polarization at 30° C. ($P_s$ (30° C.))

TABLE 10

| L.C. | $T_{PT}$(°C.) Cry | Sc* | SA | Ch | Iso | Ps(30° C.) nC/cm² |
|---|---|---|---|---|---|---|
| 3-A | $\xrightarrow{-7.9}$ $\xleftarrow{-12.5}$ | $\xleftarrow{69.8}$ | $\xleftarrow{86.2}$ | $\xleftarrow{93.4}$ | | 6.2 |
| 3-B | $\xrightarrow{-6.4}$ $\xleftarrow{-10.2}$ | $\xleftarrow{73.3}$ | $\xleftarrow{84.6}$ | $\xleftarrow{89.6}$ | | 8.6 |
| 3-C | $\xrightarrow{-8.4}$ $\xleftarrow{-17.3}$ | $\xleftarrow{63.6}$ | $\xleftarrow{79.4}$ | $\xleftarrow{84.9}$ | | 7.7 |

Figure 14:
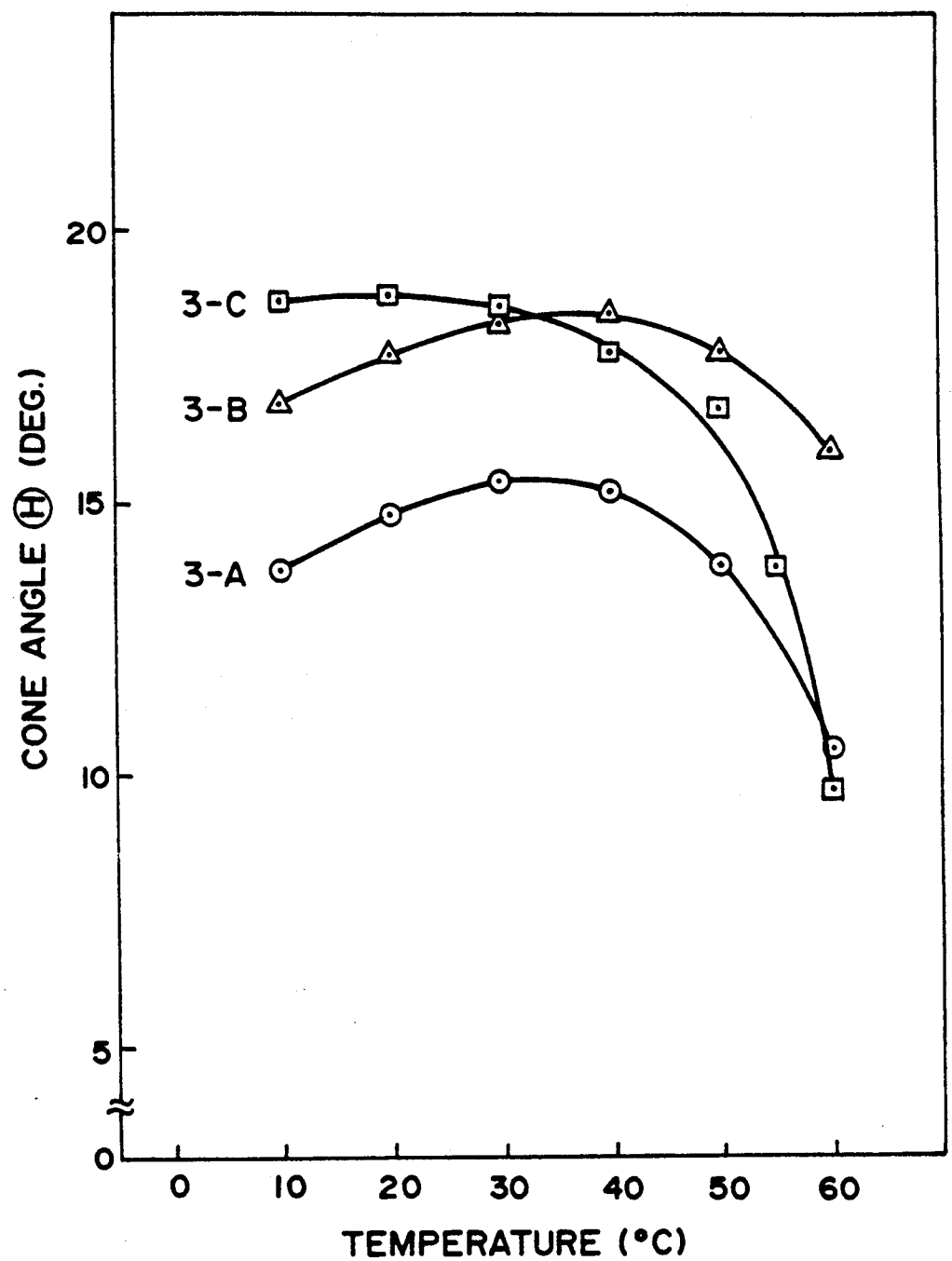
Figure 15:
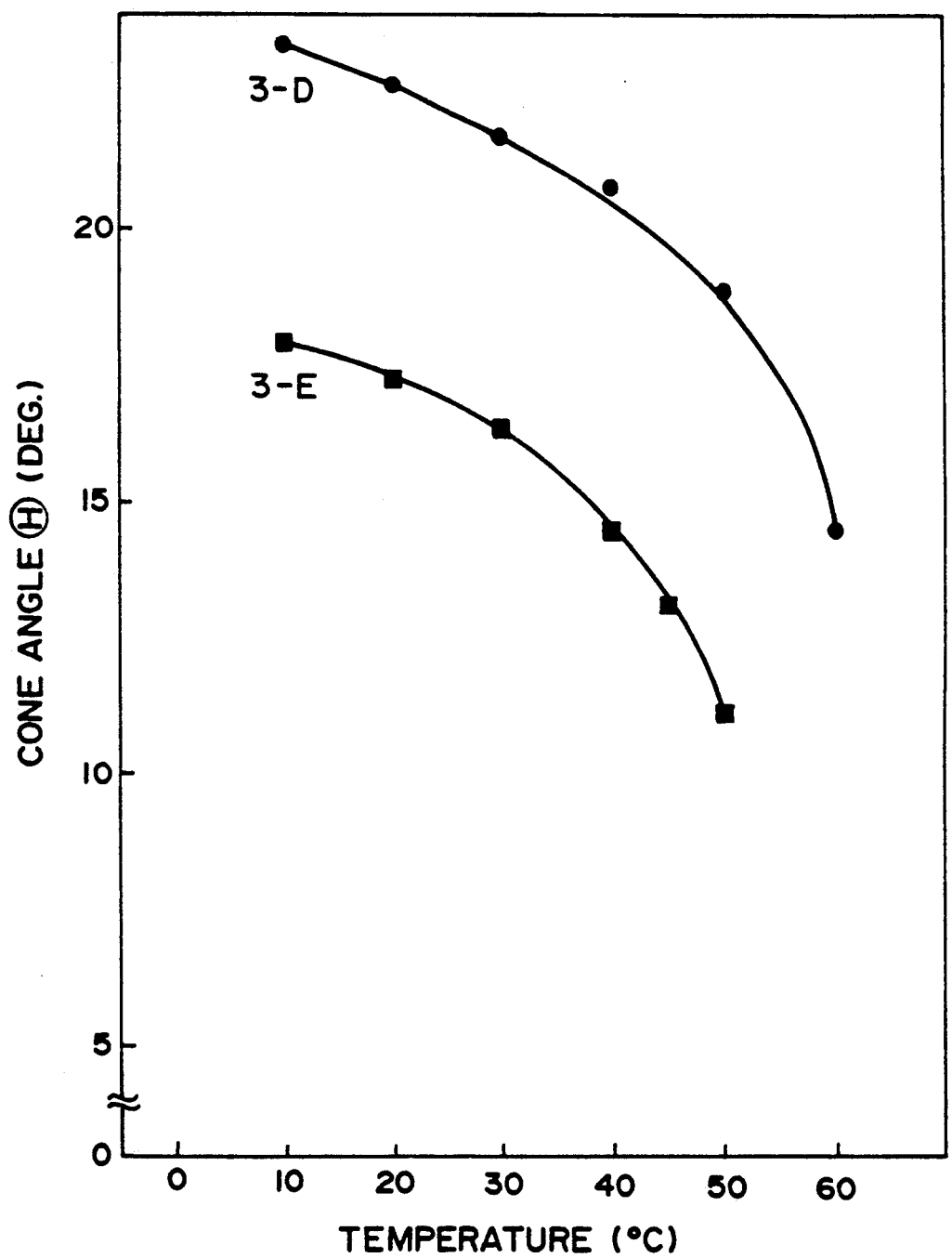
Figure 17:
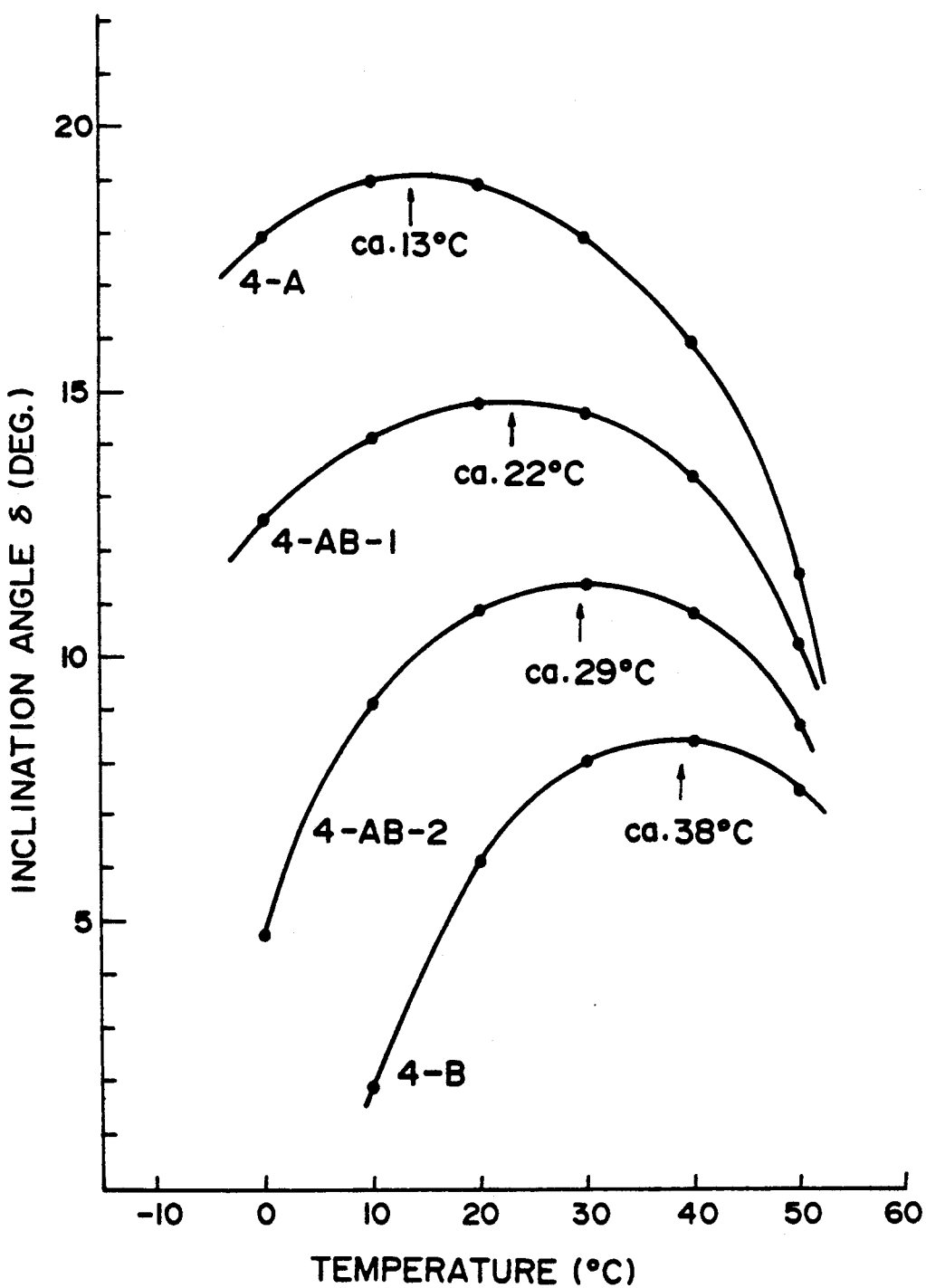
FIG. 17 is a graph showing temperature-dependence of inclination angle for several liquid crystal compositions.

The compositions 3-A, 3-B and 3-C showed the temperature-dependence of the cone angle Ⓗ as shown below and in FIG. 14.

TABLE 11

| | Cone angle (degrees) Temperature (°C.) | | | | | | | |
|---|---|---|---|---|---|---|---|---|
| L.C. | 10 | 20 | 30 | 40 | 45 | 50 | 55 | 60 |
| 3-A | 13.8 | 14.8 | 15.4 | 15.3 | — | 13.9 | — | 10.5 |
| 3-B | 16.8 | 17.7 | 18.3 | 18.5 | — | 17.8 | — | 16.0 |
| 3-C | 18.7 | 18.8 | 18.6 | 17.8 | — | 16.8 | 13.9 | 9.8 |

Ferroelectric liquid crystal devices prepared by using the compositions 3-A, 3-B and 3-C otherwise in the same manner as in Example 1 showed the following response characteristic.

TABLE 12

| | Response time (μsec) | | | | Temp. factor |
|---|---|---|---|---|---|
| L.C. | 10° C. | 20° C. | 30° C. | 40° C. | $f^{10/40}$ |
| 3-A | 150 | 116 | 78 | 57 | 2.63 |
| 3-B | 172 | 122 | 92 | 70 | 2.46 |
| 3-C | 286 | 184 | 125 | 86 | 3.33 |

COMPARATIVE EXAMPLE 3

The above-mentioned liquid crystal compositions 3-D and 3-E showed the following phase transition temperatures ($T_{PT}$) and spontaneous polarization at 30° C. ($P_s$ (30° C.))

TABLE 13

| L.C. | $T_{PT}$(°C.) Cry | Sc* | SA | Ch | Iso | Ps (30° C.) nC/cm² |
|---|---|---|---|---|---|---|
| 3-D | $\xrightarrow{0.5}$ $\xleftarrow{-15.4}$ | $\xleftarrow{71.4}$ | $\xleftarrow{87.5}$ | $\xleftarrow{96.3}$ | | 8.2 |
| 3-E | $\xrightarrow{-15.4}$ $\xleftarrow{-35}$ | $\xleftarrow{59.2}$ | $\xleftarrow{80.0}$ | $\xleftarrow{85.9}$ | | 7.6 |

The compositions 3-D and 3-E showed the temperature-dependence of the cone angle Ⓗ as shown below and in FIG. 14.

TABLE 14

| | Cone angle (degrees) Temperature (°C.) | | | | | | | |
|---|---|---|---|---|---|---|---|---|
| L.C. | 10 | 20 | 30 | 40 | 45 | 50 | 55 | 60 |
| 3-D | 23.4 | 22.7 | 21.7 | 20.8 | — | 18.9 | — | 14.5 |
| 3-E | 18.0 | 17.3 | 16.4 | 14.5 | 13.1 | 11.2 | — | — |

Ferroelectric liquid crystal devices prepared by using the compositions 3-D and 3-E otherwise in the same manner as in Example 1 showed the following response characteristic.

TABLE 15

| | Response time (μsec) | | | | Temp. factor |
|---|---|---|---|---|---|
| L.C. | 10° C. | 20° C. | 30° C. | 40° C. | $f^{10/40}$ |
| 3-D | 347 | 170 | 114 | 78 | 4.45 |
| 3-E | 314 | 175 | 106 | 68 | 4.62 |

As is clear from comparison between the above Example 3 and Comparative Example 3, the liquid crystal compositions, 3-A, 3-B and 3-C showing a mediate temperature with respect to cone angle Ⓗ showed a remarkably smaller temperature-dependence than the composition 3-D and 3-E not showing such a mediate temperature.

Further, in Example 3, it is understood that the compositions 3-A and 3-B having mediate temperatures giving a maximum cone angle at higher temperatures showed a smaller temperature-dependence than the composition 3-C having a lower mediate temperature.

EXAMPLE 4

The liquid crystal composition 2-A showing a mediate temperature (giving a maximum cone angle) at about 35° C. and liquid crystal composition 2-B showing a mediate temperature at below 10° C. were blended in weight ratios shown in the following Table 16 to prepare liquid crystal compositions 4-AB-1 and 4-AB-2.

TABLE 16

| L.C. | 2-A | 2-B |
| --- | --- | --- |
| 2-A | 100 | 0 |
| 4-AB-1 | 75 | 25 |
| 4-AB-2 | 50 | 50 |
| 2-B | 0 | 100 |

The liquid crystal compositions 4-AB-1 and 4-AB-2 showed the following phase transition temperatures ($T_{PT}$) and spontaneous polarization at 30° C. (Ps (30° C.)).

TABLE 17

| L.C. | $T_{PT}$ (°C.) Cry | Sc* | SA | Ch | Iso | Ps (30° C.) nC/cm$^2$ |
| --- | --- | --- | --- | --- | --- | --- |
| 4-AB-1 | $\xrightarrow{-11.7}$ $\xleftarrow{-17.5}$ | $\xleftarrow{63.6}$ | $\xleftarrow{82.9}$ | $\xleftarrow{89.7}$ | | 6.0 |
| 4-AB-2 | $\xrightarrow{-11.0}$ $\xleftarrow{-17.7}$ | $\xleftarrow{59.4}$ | $\xleftarrow{80.7}$ | $\xleftarrow{87.0}$ | | 6.0 |

The compositions 4-AB-1 and 4-AB-2 showed the temperature-dependence of the cone angle (H) as shown below and in FIG. 16 (shown together with compositions 2-A and 2-B).

TABLE 18

| | Cone angle (degrees) Temperature (°C.) | | | | | | | |
| --- | --- | --- | --- | --- | --- | --- | --- | --- |
| L.C. | 10 | 20 | 30 | 40 | 45 | 50 | 55 | 60 |
| 4-AB-1 | 14.8 | 14.9 | 14.6 | 13.8 | — | 12.0 | 10.0 | 4.8 |
| 4-AB-2 | 16.1 | 15.7 | 14.9 | 13.3 | 12.0 | 9.7 | — | — |

Ferroelectric liquid crystal devices were prepared using the compositions 4-AB-1 and 4-AB-2 otherwise in the same manner as in Example 1 showed the following response characteristic (shown together) with the results obtained by compositions 2-A and 2-B described in Example 2).

TABLE 19

| | Response time (μsec) | | | | Temp. factor |
| --- | --- | --- | --- | --- | --- |
| L.C. | 10° C. | 20° C. | 30° C. | 40° C. | $f^{10/40}$ |
| 2-A | 154 | 104 | 74 | 60 | 2.57 |
| 4-AB-1 | 158 | 105 | 65 | 51 | 3.10 |
| 4-AB-2 | 168 | 105 | 61 | 45 | 3.73 |
| 2-B | 172 | 104 | 60 | 42 | 4.10 |

As is understood from the above results, a liquid crystal composition having a temperature-dependence maximum of cone angle is prepared by mixing a liquid crystal composition 2-B having no maximum of cone angle (thus having a monotonously decreasing cone angle on temperature decrease) with a liquid crystal composition 2-A having such a maximum of cone angle. Along with the mixing, the temperature(-dependence) factor $f^{10/40}$ was decreased from 4.10→3.73→3.10→2.57 indicating that the temperature-dependence of response speed was remarkably alleviated.

Further, it is understood that, if the composition 4-AB-1 showing a maximum cone angle temperature of about 20° C. and the composition 2-A showing a maximum cone angle temperature of about 35° C., the composition 2-A showing a higher maximum cone angle temperature showed a smaller temperature-dependence of response speed.

EXAMPLE 5

A liquid crystal composition 11-A was prepared by using a commercially available ferroelectric liquid crystal composition ("CS-1017", mfd. by Chisso K.K.) showing an ordinary temperature-dependence of smectic layer inclination angle δ (i.e., showing a monotonously decreasing inclination angle on temperature decrease) as follows:

11-A

CS-1017      90 parts

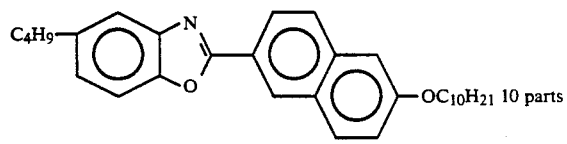

$OC_{10}H_{21}$ 10 parts

The compositions CS-1017 and 11-A showed the phase transition temperatures ($T_{PT}$) and spontaneous polarization at 30° C. (Ps (30° C.)) as follows.

TABLE 20

| L.C. | $T_{PT}$ (°C.) Cry | Sc* | SA | Ch | Iso | Ps (30° C.) nC/cm$^2$ |
| --- | --- | --- | --- | --- | --- | --- |
| CS-1017 | $\xrightarrow{-10}$ $\xleftarrow{-23}$ | $\xleftarrow{55}$ | $\xleftarrow{66}$ | $\xleftarrow{72}$ | | 3.8 |
| 11-A | $\xrightarrow{-15}$ $\xleftarrow{-26}$ | $\xleftarrow{54}$ | $\xleftarrow{69}$ | $\xleftarrow{75}$ | | 7.8 |

The compositions CS-1017 and 11-A showed the temperature-dependence of layer inclination angle δ (degrees) as measured by the above-mentioned X-ray diffraction analysis as follows:

TABLE 21

| | Inclination angle δ (degrees) Temperature (°C.) | | | | | | |
| --- | --- | --- | --- | --- | --- | --- | --- |
| L.C. | −10 | 0 | 10 | 20 | 30 | 40 | 50 |
| CS-1017 | 25.3 | 25.1 | 24.6 | 23.9 | 22.6 | 20.3 | 16.8 |
| 11-A | 21.1 | 21.5 | 21.7 | 21.1 | 19.8 | 17.8 | 14.5 |

Two 0.7 mm-thick glass plates were provided and respectively coated with an ITO film to form an electrode for voltage application, which was further coated with an insulating layer of vapor-deposited $SiO_2$. The insulating layer was further coated with a 0.2% isopropyl alcohol solution of silane coupling agent ("KBH-602" available from Shin Etsu Kagaku K.K.) by spin coating at 2000 r.p.m. for 15 sec., followed by drying at 120° C. for 20 min. The glass plate thus treated was further coated with a 1.5%-solution of polyimide resin precursor (SP-510, available from Toray K.K.) in dimethylacetoamide by a spinner coater rotating at 2000 rpm for 15 seconds. Thereafter, the coating film was subjected to heat curing at 300° C. for 60 min. to obtain about 250 Å-thick film.

The coating film was rubbed with acetate fiber-planted cloth. The thus treated two glass plates were washed with isopropyl alcohol. After silica beads with an average particle size of 2.0 μm were dispersed on one of the glass plates, the two glass plates were applied to each other with a bonding sealing agent ("Lixon Bond", available from Chisso K.K.) so that their rubbed directions were parallel to each other and heated at 100° C. for 60 min. to form a blank cell. The cell gap was found to be about 2.0 μm as measured by a Berek compensator.

Then, each of the above-prepared liquid crystal compositions CS-1017 and 11-A was heated into an isotropic liquid, and injected into the above prepared cell under vacuum and, after sealing, was gradually cooled at a rate of 20° C./hour to 25° C. to prepare a ferroelectric liquid crystal device.

The two ferroelectric liquid crystal devices thus prepared were respectively subjected measurement of response characteristic by applying a peak-to-peak voltage $V_{pp}$ 20 volts to measure a time of causing a transmittance change of 0–90% under right angle cross nicols (hereinafter referred to as optical response time). The results are shown below.

TABLE 22

| L.C. | Optical response time (μsec) | | | | | Temp. factor $f^{0/40}$ |
|---|---|---|---|---|---|---|
| | 0° C. | 10° C. | 20° C. | 30° C. | 40° C. | |
| CS-1017 | 2480 | 825 | 325 | 180 | 100 | 24.8 |
| | (3.0) | (2.5) | (1.8) | (1.8) | | |
| 1-A | 1360 | 590 | 312 | 175 | 96 | 14.2 |
| | (2.3) | (1.9) | (1.8) | (1.8) | | |

Temperature factor (temperature-dependence factor) $f^{0/40}$ means a ratio of optical response time at 0° C./optical response time at 40° C., and the values in the parentheses represent temperature (-dependence) factor at 10° C. increments, i.e., $f^{0/10}$, $f^{10/20}$, $f^{20/30}$ and $f^{30/40}$, in order. In this instance, there is a relationship of $f^{0/40} = f^{0/10} \times f^{10/20} \times f^{20/30} \times f^{30/40}$.

As is understood from the above results, the liquid crystal composition 11-A having a maximum followed by a decrease of layer inclination angle δ on temperature decrease showed a smaller temperature-dependence of response time than the base liquid crystal composition CS-1017 showing a monotonously increasing layer inclination angle δ, particularly in a temperature region of below 10° C. where the decrease in δ was pronounced, thus resulting in a remarkable difference in temperature factor $f^{0/10}$. Thus, an improvement in temperature-dependence of response speed was confirmed.

EXAMPLE 6

A liquid crystal composition 12-A was prepared by using a commercially available ferroelectric liquid crystal composition ("ZLI-3233", mfd. by Merck Co.) showing an ordinary temperature-dependence of smectic layer inclination angle δ (i.e., showing a monotonously decreasing inclination angle on temperature decrease) as follows:

| 12-A | |
|---|---|
| ZLI-3233 | 65 parts |
| $C_{10}H_{21}O$—⟨phenyl⟩—CO—⟨phenyl⟩—OCH$_2$CHCH$_3$C$_2$H$_5$ | 25 parts |
| $C_4H_9$—⟨benzoxazole⟩—⟨naphthyl⟩—OC$_{10}$H$_{21}$ | 10 parts |

The compositions ZLI-3233 and 12-A showed the phase transition temperatures ($T_{PT}$) and spontaneous polarization at 30° C. (Ps (30° C.)) as follows.

TABLE 23

| L.C. | $T_{PT}$ (°C.) | | | | | Ps (30° C.) nC/cm$^2$ |
|---|---|---|---|---|---|---|
| | Cry | Sc* | SA | Ch | Iso | |
| ZLI-3233 | $\xrightarrow{-15}$ ← | $\xleftarrow{72}$ | $\xleftarrow{78}$ | $\xleftarrow{90}$ | | 9.9 |
| 12-A | $\xrightarrow{-13}$ ← | $\xleftarrow{56}$ | $\xleftarrow{71}$ | $\xleftarrow{84}$ | | 3.9 |

The compositions ZLI-3233 and 12-A showed the following temperature-dependence of layer inclination angle δ.

TABLE 24

| L.C. | Inclination angle δ (degrees) | | | | | | |
|---|---|---|---|---|---|---|---|
| | Temperature (°C.) | | | | | | |
| | −10 | 0 | 10 | 20 | 30 | 40 | 50 |
| ZLI-3233 | 29.1 | 28.7 | 28.4 | 27.8 | 27.0 | 25.7 | 23.9 |
| 12-A | 16.6 | 17.0 | 17.2 | 16.7 | 15.7 | 13.7 | 10.2 |

Ferroelectric liquid crystal devices were prepared in the same manner as in Example 5 except for the use of the compositions ZLI-3233 and 12-A, respectively, instead of the compositions 11-A and subjected to the measurement of optical response time in the same manner as in Example 5. The results are shown below.

TABLE 25

| L.C. | Optical response time (μsec) | | | | | Temp. factor $f^{0/40}$ |
|---|---|---|---|---|---|---|
| | 0° C. | 10° C. | 20° C. | 30° C. | 40° C. | |
| ZLI-3233 | 7840 | 2560 | 1040 | 475 | 250 | 31.4 |
| | (3.1) | (2.5) | (2.2) | (1.9) | | |
| 12-A | 4230 | 1760 | 790 | 404 | 228 | 18.6 |
| | (2.4) | (2.2) | (2.0) | (1.8) | | |

As is understood from the above results, the liquid crystal composition 12-A having a maximum followed by a decrease of layer inclination angle δ on temperature decrease showed a smaller temperature-dependence of response time than the base liquid crystal composition ZLI-3233 showing a monotonously increasing layer inclination angle δ, particularly in a temperature region of below 10° C. where the decrease in δ was pronounced, thus resulting in a remarkable difference in temperature factor $f^{0/10}$. Thus, an improvement in temperature-dependence of response speed was confirmed.

EXAMPLE 7

A liquid crystal composition 13-A was prepared by using a commercially available ferroelectric liquid crystal composition ("CS-1031", mfd. by Chisso K.K.) showing an ordinary temperature-dependence of smectic layer inclination angle δ (i.e., showing a monotonously decreasing inclination angle on temperature decrease) as follows:

| 13-A | |
|---|---|
| CS-1031 | 90 parts |
| 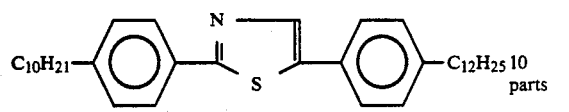 | 10 parts |

The compositions CS-1031 and 13-A showed the phase transition temperatures ($T_{PT}$) and spontaneous polarization at 30° C. (Ps (30° C.)) as follows.

TABLE 26

| L.C. | $T_{PT}$(°C.) | | | | | Ps(30° C.) hC/cm$^2$ |
|---|---|---|---|---|---|---|
| | Cry | | Sc* | SA | Ch | Iso | |
| CS-1031 | ⇄ 2.6 / −23.6 | ← 66 | ← 87 | ← 101 | | 23.7 |
| 13-A | ⇄ −0.5 / −28 | ← 56 | ← 90 | ← 101 | | 14.8 |

The compositions CS-1031 and 13-A showed the following temperature-dependence of layer inclination angle δ.

TABLE 27

| | Inclination angle δ (degrees) | | | | |
|---|---|---|---|---|---|
| | Temperature (°C.) | | | | |
| L.C. | 0 | 10 | 20 | 30 | 40 |
| CS-1031 | 17.1 | 17.0 | 16.8 | 16.4 | 15.4 |
| 13-A | 10.4 | 10.7 | 10.9 | 10.4 | 8.8 |

Ferroelectric liquid crystal devices were prepared in the same manner as in Example 5 except for the use of the compositions CS-1031 and 13-A, respectively, instead of the composition 11-A and subjected to the measurement of optical response time in the same manner as in Example 5. The results are shown below.

TABLE 28

| L.C. | Optical response time (μsec) | | | | Temp. factor $f^{0/30}$ |
|---|---|---|---|---|---|
| | 0° C. | 10° C. | 20° C. | 30° C. | |
| CS-1031 | 240 | 106 (1.8) | 58.0 (1.6) | 36.1 | 6.6 |
| | | (2.3) | | | |
| 13-A | 162 | 84.0 | 51.0 | 31.4 | 5.2 |
| | (1.9) | (1.6) | (1.6) | | |

As is understood from the above results, the liquid crystal composition 13-A having a maximum followed by a decrease of layer inclination angle δ on temperature decrease showed a smaller temperature-dependence of response time than the base liquid crystal composition CS-1031 showing a monotonously increasing layer inclination angle δ, particularly in a temperature region of 0°–20° C. where the decrease in δ was pronounced, thus resulting in remarkable differences in temperature factor $f^{0/10}$ and $f^{10/20}$. Thus, an improvement in temperature-dependence of response speed was confirmed.

EXAMPLE 8

A liquid crystal composition 14-A showing a maximum $δ_{max}$ of layer inclination angle δ at about 35° C. and a liquid crystal composition 14-B showing a $δ_{max}$ at about 10° C., were prepared. Then, compositions 14-AB-11 and 14-AB-12 were prepared by mixing the compositions 14-A and 14-B in weight ratios shown in the following Table 29.

The phase transition temperatures and spontaneous polarization at 10° C., 30° C. and 50° C. of these compositions are also shown in Table 29.

TABLE 29

| L.C. (14-A/14-B) | $T_{PT}$(°C.) | | | | | Ps(nc/cm$^2$) | | |
|---|---|---|---|---|---|---|---|---|
| | Cry | Sc* | SA | Ch | Iso | 10° C. | 30° C. | 50° C. |
| 14-A | ⇄ 12 / −7 | ← 58 | ← 72 | ← 88 | | 2.2 | 1.8 | 1.0 |
| 14-AB-11 (2/1) | ⇄ −4 / −12 | ← 60 | ← 76 | ← 89 | | 3.7 | 3.1 | 2.1 |
| 14-AB-12 (1/2) | ⇄ −12 / −15 | ← 61 | ← 81 | ← 91 | | 4.8 | 4.0 | 2.7 |
| 14-B | ⇄ −10 / −13 | ← 64 | ← 86 | ← 92 | | 5.8 | 4.7 | 3.1 |

The above composition showed the following temperature-dependence of layer inclination angle δ.

TABLE 30

| L.C. | Inclination angle δ (degree) | | | | | | $T_{δmax}$ (°C.) |
|---|---|---|---|---|---|---|---|
| | Temperature (°C.) | | | | | | |
| | 0 | 10 | 20 | 30 | 40 | 50 | |
| 14-A | 17.9 | 19.0 | 18.9 | 17.9 | 15.7 | 11.0 | ca. 13 |
| 14-AB-11 | 12.6 | 14.2 | 14.8 | 14.6 | 13.3 | 9.9 | ca. 22 |
| 14-AB-12 | 4.8 | 9.2 | 10.9 | 11.4 | 10.8 | 8.6 | ca. 29 |
| 14-B | — | 2.0 | 6.2 | 8.2 | 8.5 | 7.5 | ca. 38 |

Ferroelectric liquid crystal devices were prepared in the same manner as in Example 5 except for the use of the compositions 14-A, 14-B, 14-AB-11 and 14-AB-12, respectively, instead of the composition 11-A and subjected to the measurement of optical response time in the same manner as in Example 5. The results are shown below.

TABLE 31

| L.C. | Optical response time (μsec) | | | | | Temp. factor $f^{10/50}$ |
|---|---|---|---|---|---|---|
| | 10° C. | 20° C. | 30° C. | 40° C. | 50° C. | |
| 14-A | 584 | 344 | 201 | 118 | 71 | 8.2 |
| | (1.70) | (1.71) | (1.70) | (1.66) | | |
| 14-AB-11 | 376 | 231 | 149 | 95 | 59 | 6.4 |
| | (1.63) | (1.55) | (1.57) | (1.61) | | |
| 14-AB-12 | 224 | 149 | 108 | 74 | 47 | 4.8 |
| | (1.50) | (1.38) | (1.46) | (1.57) | | |
| 14-B | 134 | 102 | 81 | 59 | 38 | 3.5 |
| | (1.31) | (1.26) | (1.37) | (1.55) | | |

As is understood from the above results, the liquid crystal compositions 14-A, 14-B, 14-AB-11 and 14-AB-12 showing a temperature-dependence of layer inclination angle of showing a maximum followed by a decrease on temperature decrease showed smaller and alleviated temperature-dependence of response speed than the liquid crystal compositions ZLI-3233 and CS-1017 showing an ordinary inclination angle tendency of monotonously increasing on temperature decrease. Further, it is shown that a liquid crystal composition showing $\delta_{max}$ at a higher temperature showed a smaller temperature-dependence of response speed around that temperature, resulting in a higher degree of improvement in overall temperature dependence in the total temperature region. An ordinary liquid crystal composition has a temperature-dependence of response speed which largely depends on the viscosity and is therefore liable to change steeply on a low temperature side according to a relationship like that represented by the Arrhenires3 equation, e.g., $f^{10/20} \geq f^{20/30} \geq f^{30/40}$. However, the liquid crystal compositions shown in this Example generally showed $f^{10/20}$ which was rather smaller even in a low temperature region where $\delta$ began to decrease on temperature decrease. Thus, the following relationships were for example found.

$f^{10/20} \leq f^{20/30}$ for 14-A $f^{20/30} \leq f^{30/40} < f^{40/50}$ for 14-AB-11

$f^{20/30} < f^{30/40} < f^{40/50}$ for 14-AB-12

$f^{20/30} (< f^{10/20}) < f^{30/40} < f^{40/50}$ for 14-B.

EXAMPLES 9-14, COMPARATIVE EXAMPLES 4-7

Two 1.1 mm-thick glass plates were provided as a pair of substrates and were respectively coated with transparent ITO stripe electrodes each having a side metal wire of molybdenum, followed by coating with a 1500 Å-thick tantalum oxide as a transparent dielectric film by sputtering.

A solution in NMP of a polyimide precursor ("LQ 1802" mfd. by Hitachi Kasei K.K.) was applied onto the tantalum oxide film and baked at 270° C. to form a 300 Å-thick polyimide alignment film. The baked film was then rubbed with acetate fiber planted cloth. Then, on one of the substrates, epoxy resin adhesive particles having an average particle size of 5.5 μm ("Torepearl" (trade name), available from Toray K.K.) were dispersed at a density of 30 particles/mm² by the Nord Son electrostatic dispersion method and, on the other substrate, silica micro-beads having an average particle size of 1.5 μm were dispersed at a density of 300 particles/mm² by the Knudsen electrostatic dispersion method. Then, a liquid adhesive ("Struct Bond" (trade name), mfd. by Mitsui Toatsu K.K.) as a sealing member was applied by printing in a thickness of 6 μm. Then, the two glass plates were applied to each other so that their rubbed directions extended generally in the same direction but intersected each other at a counterclockwise angle of 6-10 degrees, and bonded to each other by applying a pressure of 2.8 kg/cm² at 70° C. for 5 min, followed by further curing of the two types of adhesives under a pressure of 0.63 kg/cm³ at 150° C. for 4 hours to form a blank cell.

Then, 7 blank cells prepared in the above described manner were respectively evacuated to a reduced pressure of $10^{-4}$ torr and then filled with liquid crystal compositions A-G, respectively, having the properties shown in Tables 32 and 33 below.

TABLE 32

| L.C. | $T_{PT}$(°C.) | | | | Ps (nC/cm²) (30° C.) | Θ(°) (30° C.) |
|---|---|---|---|---|---|---|
| | Cry  SmC*  SmA  Ch  Iso | | | | | |
| A | $\xleftarrow[-18.0]{2.0 \rightarrow} \xleftarrow{46.6} \xleftarrow{69.5} \xleftarrow{78.0}$ | | | | 3.8 | 14.4 |
| B | $\xleftarrow[-14.7]{-10.4 \rightarrow} \xleftarrow{66.4} \xleftarrow{84.6} \xleftarrow{90.9}$ | | | | 5.8 | 14.9 |
| C | $\xleftarrow[-10.8]{-8.4 \rightarrow} \xleftarrow{64.1} \xleftarrow{85.8} \xleftarrow{92.0}$ | | | | 4.6 | 13.5 |
| D | $\xleftarrow[-31.0]{-12.1 \rightarrow} \xleftarrow{64.0} \xleftarrow{89.3} \xleftarrow{95.6}$ | | | | 5.3 | 15.1 |
| E | $\xleftarrow[-22.0]{-9.5 \rightarrow} \xleftarrow{53.5} \xleftarrow{75.8} \xleftarrow{82.0}$ | | | | 5.8 | 14.9 |
| F | $\xleftarrow[-8.1]{6.4 \rightarrow} \xleftarrow{57.0} \xleftarrow{105} \xleftarrow{122}$ | | | | 3.4 | 14.1 |
| G | $\xleftarrow[-8.1]{6.4 \rightarrow} \xleftarrow{57.0} \xleftarrow{105} \xleftarrow{122}$ | | | | 3.1 | 13.0 |

TABLE 33

| L.C. | Layer inclination angle δ (degrees) | | | | |
|---|---|---|---|---|---|
| | 10° C. | 20° C. | 30° C. | 40° C. | 50° C. |
| A | 10.8 | 11.7 | 10.9 | 9.9 | — |
| B | 6.3 | 8.8 | 10.0 | 10.5 | 9.7 |
| C | 4.0 | 7.2 | 8.2 | 8.5 | 7.5 |
| D | 8.9 | 9.6 | 10.0 | 9.8 | 8.6 |
| E | 10.9 | 10.8 | 10.5 | 9.0 | — |
| F | 12.5 | 12.4 | 12.3 | 11.4 | 9.6 |
| G | 11.5 | 11.3 | 11.1 | 10.2 | 8.0 |

Then, the respective cells were cooled through cholesteric and smectic A phases to 25° C. providing chiral smectic C phase, to provide 7 liquid crystal devices, each constituting a display panel 103 as shown in FIG. 10 having a lateral size (data line side) of about 280 mm, a vertical size (scan line side) of 220 mm and a number of pixels of 1280×1024.

Each display panel incorporated in a display apparatus as shown in FIG. 10 was used for displaying by applying a set of driving waveforms shown in FIG. 6 at scan side voltages of ±10.5 volts (partly 4.5 volts) and data side voltages of ±4.5 volts.

The respective panels provides evaluation data as shown in Table 34 below. The persistence time was measured by writing a white-black checker pattern of 80×80 on a panel for 3 min. and rewriting the entire display panel into a black display state to observe with eyes the time in which the entire display was converted into a uniform black state. The temperature was measured by measuring the panel surface temperature with a thermo-couple while controlling the environmental temperature within a thermostat vessel.

and alleviated the temperature-dependence of driving characteristics.

EXAMPLE 15

The optical response characteristic of the liquid crystal compositions 2-A and 2-B used in Example 2 was examined by using cells prepared in the following manner.

Two glass substrates provided with transparent electrodes were coated with a tantalum oxide film by sputtering, and a 1% solution in NMP of polyamide acid ("LQ-1802", mfd, by Hitachi Kasei K.K.) was applied by a spinner and baked at 270° C. for 1 hour to form a polyimide film.

The two substrates were then rubbed and then applied to each other with a gap therebetween of 1.2–1.3 μm so that their rubbing directions extended generally

TABLE 34

|  | L.C. | α(°) | φ*(°) | θa(°) (30° C.) | Persistence time (sec) (drive 1H (μsec)) | | | | Temp. factor ($f^{10/40}$) |
|---|---|---|---|---|---|---|---|---|---|
|  |  |  |  |  | 10° C. | 20° C. | 30° C. | 40° C. |  |
| Ex. 9 | A | 17 | 8 | 10.3 | 4.1 (420) | 7.9 (290) | 3.5 (170) | — | (—) |
| Ex. 10 | B | 18 | 10 | 11.2 | 0.7 (200) | 1.5 (170) | 2.7 (130) | 3.2 (105) | (1.9) |
| Ex. 11 | B | 20 | 10 | 11.3 | 0.5 (192) | 0.9 (170) | 2.1 (130) | 3.0 (105) | (1.8) |
| Ex. 12 | C | 17 | 8 | 9.8 | 0.5 (165) | 0.7 (150) | 1.5 (122) | 1.5 (92) | (1.8) |
| Ex. 13 | C | 18 | 10 | 9.6 | 0.5 (170) | 0.8 (150) | 1.5 (122) | 1.8 (90) | (1.9) |
| Ex. 14 | D | 16 | 8 | 11.7 | 2.6 (320) | 3.1 (220) | 4.1 (145) | 2.7 (110) | (2.9) |
| Comp. Ex. 4 | E | 14 | 6 | 11.0 | 14 (340) | 6.3 (230) | 3.1 (150) | 1.9 (80) | (4.3) |
| Comp. Ex. 5 | F | 20 | 10 | 10.0 | 30< (420) | 24 (290) | 17 (160) | 5.4 (120) | (3.5) |
| Comp. Ex. 6 | G | 16 | 8 | 9.0 | 27 (350) | 13 (240) | 5.0 (125) | 2.2 (100) | (3.5) |
| Comp. Ex. 7 | G | 18 | 10 | 9.0 | 23 (340) | 12 (230) | 6.5 (120) | 3.2 (96) | (3.5) |

*φ: cell intersection angle

The time 1H shown in the above Table 34 denotes a time for writing on one line (as shown in FIG. 6) and was adjusted for each panel so as to provide a good display state on the entire panel.

All the Example devices clearly satisfied all the conditions (I), (II) and (III) described above and provided a high contrast of at least 20.

The display panels of Examples 9–14 did not cause a divergent increase of persistence time on decrease of environmental temperature but rather caused a decrease on a low temperature, thus not causing a remarkable deterioration of display quality on a low temperature. In contrast thereto, the display panels of Comparative Examples 4–7 provided a remarkably longer persistence time, thus impairing the display quality, on a lower temperature side.

Further, except for the panel of Example 9 using liquid crystal composition A having a low SmA→SmC* transition temperature, the panels of Examples 10–14 showed a temperature factor $f^{10/40}$ indicating a temperature-dependence of drive 1H-time as low as 1.8–2.9 which were much better than 3.5–4.3 of Comparative Examples 4–7.

As is clear from the above results, the liquid crystal devices using a liquid crystal composition showing a temperature characteristic of layer inclination angle δ which assumed a maximum of δ and decreased on further temperature decrease, could suppress the occurrence of remarkable persistence at low temperatures in the same direction but intersected at an intersection angle (as described) of 10 degrees, thereby to form a blank cell.

The cells thus prepared were filled with the liquid crystal compositions 2-A and 2-B, respectively in an isotropic liquid state and then cooled at a rate of 20° C./hour to form ferroelectric liquid crystal devices, which showed a pretilt angle α of 17 degrees as measured by the crystal rotation method.

The ferroelectric liquid crystal devices thus prepared were respectively driven by applying the set of driving waveforms shown in FIGS. 21A and 21B (⅓ bias ratio) to measure the drive voltage margin ΔV (V₃−V₁) while setting Δt so as to provide $V_1 \approx 15$ volts. The results are shown in the following Tables 35 and 36.

TABLE 35

| L.C. 2-A | 10° C. | 20° C. | 30° C. | 40° C. | 50° C. |
|---|---|---|---|---|---|
| Drive voltage margin ΔV (V) | 5.9 | 6.3 | 8.0 | 8.4 | 3.8 |
| Set Δt (μsec) | 104 | 74 | 62 | 42 | 23 |

TABLE 36

| L.C. 2-B | 10° C. | 20° C. | 30° C. | 40° C. | 50° C. |
|---|---|---|---|---|---|
| Drive voltage margin ΔV (V) | 3.0 | 3.4 | 4.8 | 2.4 | 0.2 |

TABLE 36-continued

| L.C. 2-B | 10° C. | 20° C. | 30° C. | 40° C. | 50° C. |
|---|---|---|---|---|---|
| Set Δt (μsec) | 152 | 98 | 73 | 44 | 18 |

Further, the respective devices under various temperatures while setting the voltages to mid values ($=Vs+V_I=(V_3+V_1)/2$) within the ranges of the drive voltage margin at 30° C. to measure a drive temperature margin, i.e., a temperature range (difference) where the drive was possible. The results were as follows.

| | Drive temperature margin |
|---|---|
| Composition 2-A | ±8.0° C. |
| Composition 2-B | ±4.1° C. |

The devices showed transmittances (in terms of transmission photo-voltages as measured by a photomultiplier) at white and black levels, and contrasts (i.e., ratio of transmittances between white and black levels) as shown in the following Table 37.

TABLE 37

| L.C. | | Photo-voltage (mV)/Contrast (−) | | | | |
|---|---|---|---|---|---|---|
| | | 10° C. | 20° C. | 30° C. | 40° C. | 50° C. |
| 2-A | Transmittance of white | 1660 | 1870 | 1990 | 1970 | 1770 |
| | Transmittance of black | 32 | 41 | 48 | 46 | 38 |
| | Contrast | 52 | 46 | 41 | 43 | 46 |
| 2-B | Transmittance of white | 2100 | 2080 | 2020 | 1860 | 1720 |
| | Transmittance of black | 72 | 46 | 38 | 31 | 20 |
| | Contrast | 29 | 45 | 53 | 60 | 86 |

As shown in the above Table, the device using the composition 2-A showed a contrast variation factor (ratio of maximum contrast/minimum contrast) of 1.27 while the device using composition 2-B showed a contrast variation factor of 2.97.

As is understood from the above results, the liquid crystal device using the liquid crystal composition showing a maximum cone angle with temperature change did not cause a lowering in contrast at low temperatures but provided a contrast variation factor of 1.27, thus showing remarkably improved temperature-dependence characteristics compared with the liquid crystal device using the liquid crystal composition 2-B.

Further, the liquid crystal composition 2-A provided substantially broader drive voltage margin and drive temperature margin than the liquid crystal composition 2-B.

EXAMPLE 16

Ferroelectric liquid crystal devices were prepared are evaluated with respect to drive voltage margins ΔV in the same manner as in Example 15 except that the liquid crystal compositions 3-A, 3-B, and 3-C used in Example 3 were used instead of the liquid crystal compositions 2-A and 2-B.

The thus-prepared devices showed the results given in the following Tables 38–40.

TABLE 38

| L.C. 3-A | 10° C. | 20° C. | 30° C. | 40° C. | 50° C. |
|---|---|---|---|---|---|
| Drive voltage margin ΔV (V) | 6.0 | 6.2 | 8.2 | 8.6 | 4.0 |

TABLE 38-continued

| L.C. 3-A | 10° C. | 20° C. | 30° C. | 40° C. | 50° C. |
|---|---|---|---|---|---|
| Set Δt (μsec) | 118 | 102 | 84 | 60 | 32 |

TABLE 39

| L.C. 3-B | 10° C. | 20° C. | 30° C. | 40° C. | 50° C. |
|---|---|---|---|---|---|
| Drive voltage margin ΔV (V) | 4.8 | 4.9 | 5.2 | 7.4 | 4.0 |
| Set Δt (μsec) | 198 | 130 | 104 | 80 | 51 |

TABLE 40

| L.C. 3-C | 10° C. | 20° C. | 30° C. | 40° C. | 50° C. |
|---|---|---|---|---|---|
| Drive voltage margin ΔV (V) | 3.0 | 3.4 | 4.0 | 3.8 | 3.6 |
| Set Δt (μsec) | 178 | 124 | 89 | 54 | 28 |

Further, the devices using the compositions 3-A, 3-B, and 3-C showed the following drive temperature margin at 30° C..

| | Drive temperature margin |
|---|---|
| Composition 3-A | ±8.0° C. |
| Composition 3-B | ±7.1° C. |
| Composition 3-C | ±4.8° C. |

Further, the devices showed the transmittances at white and black levels and contrasts shown in the following Table 41.

TABLE 41

| L.C. | | Photo-voltage (mV)/Contrast (−) | | | | |
|---|---|---|---|---|---|---|
| | | 10° C. | 20° C. | 30° C. | 40° C. | 50° C. |
| 3-A | Transmittance of white | 1650 | 1800 | 2010 | 2005 | 1880 |
| | Transmittance of black | 38 | 47 | 54 | 50 | 37 |
| | Contrast | 43 | 40 | 37 | 40 | 49 |
| 3-B | Transmittance of white | 2360 | 2440 | 2400 | 2280 | 2100 |
| | Transmittance of black | 98 | 98 | 89 | 71 | 50 |
| | Contrast | 24 | 25 | 27 | 32 | 42 |
| 3-C | Transmittance of white | 2400 | 2350 | 2310 | 2200 | 2080 |
| | Transmittance of black | 114 | 84 | 62 | 49 | 38 |
| | Contrast | 21 | 28 | 37 | 45 | 55 |

Thus, the devices using the compositions 3-A, 3-B, and 3-C showed contrast variation factors 1.32, 1.50 and 2.62, respectively.

Figure 18:
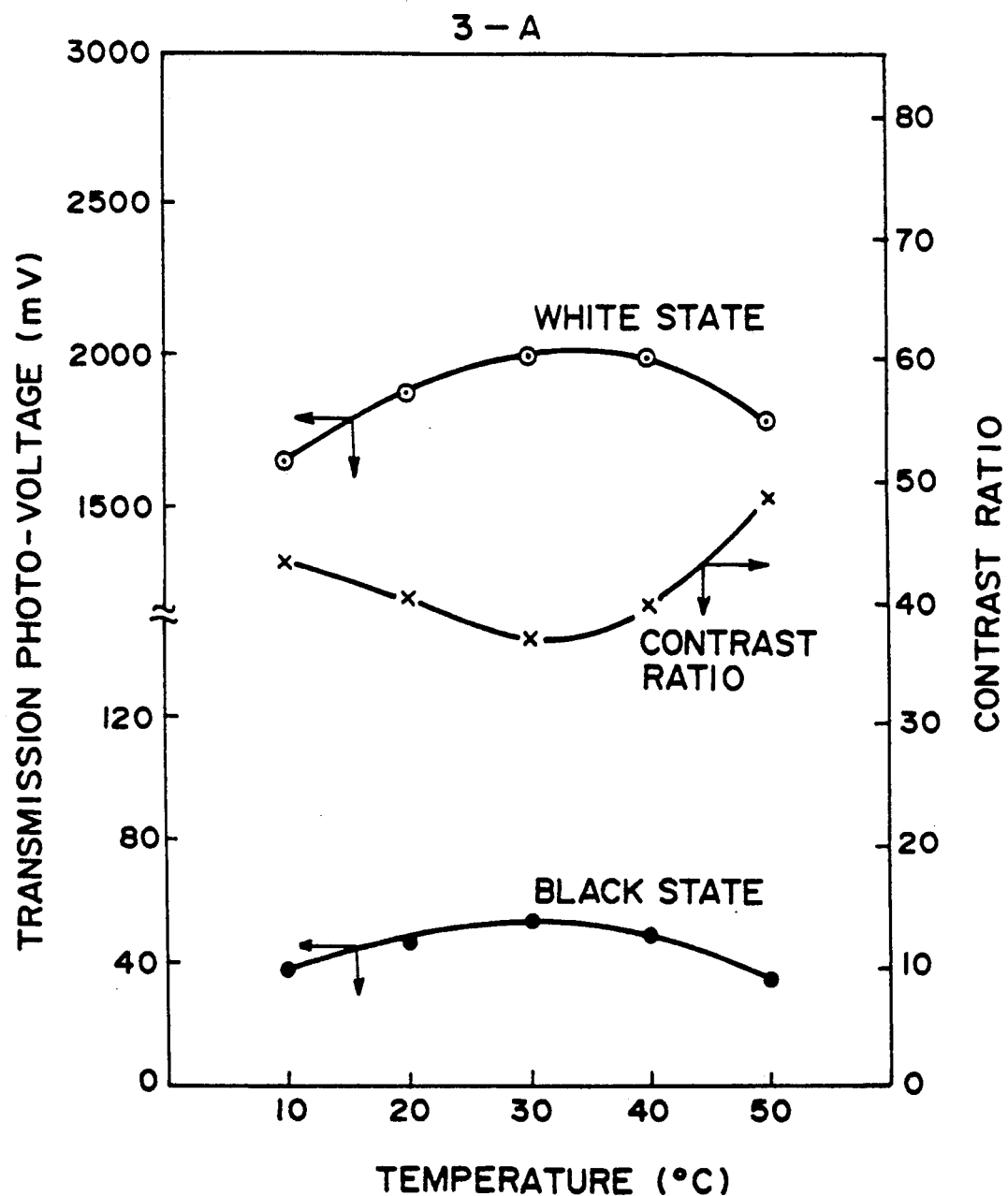
FIGS. 18 through 20 are respectively a graph showing temperature-dependence of transmittance and contrast ratio of a liquid crystal device.
Figure 19:
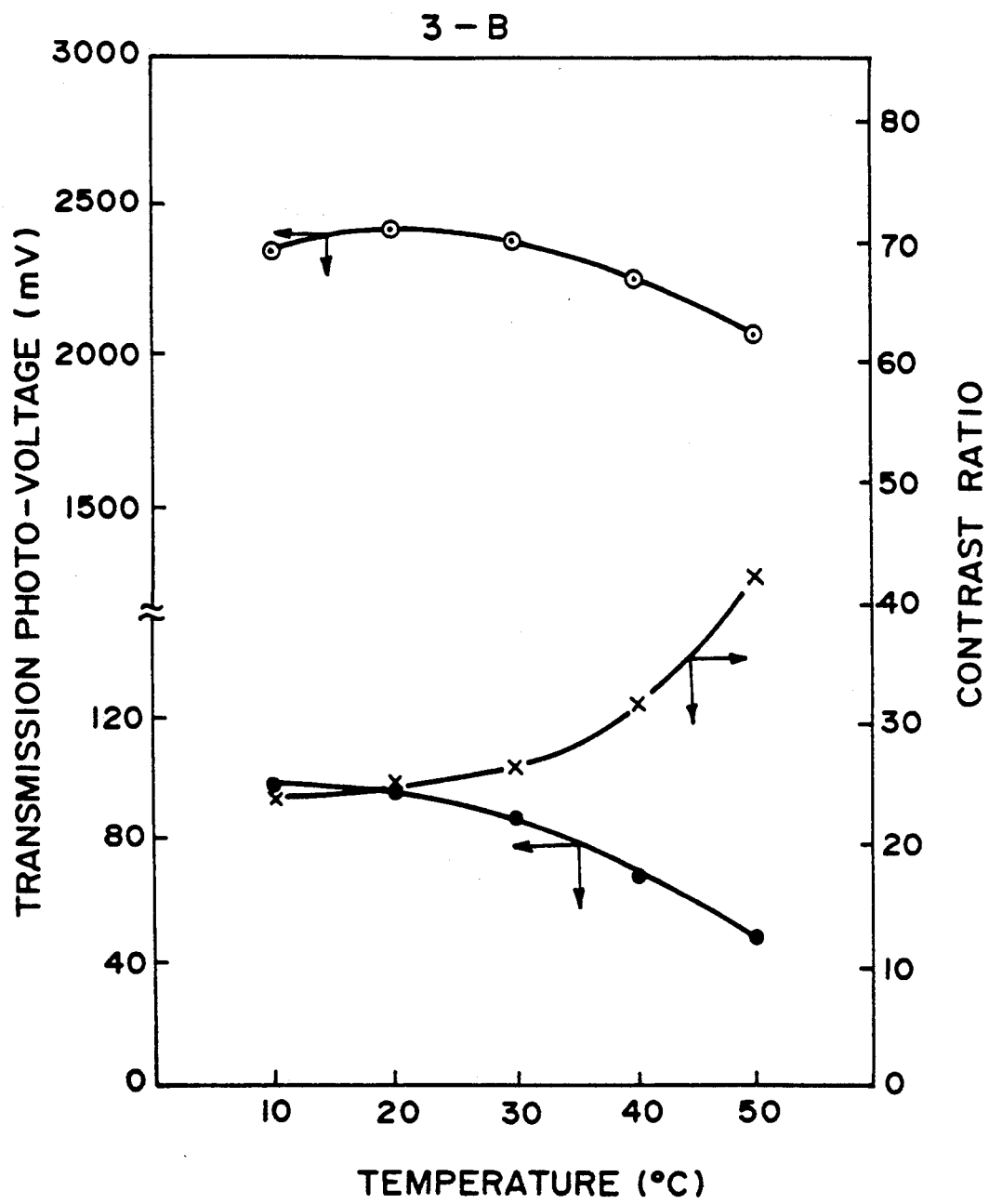
Figure 20:
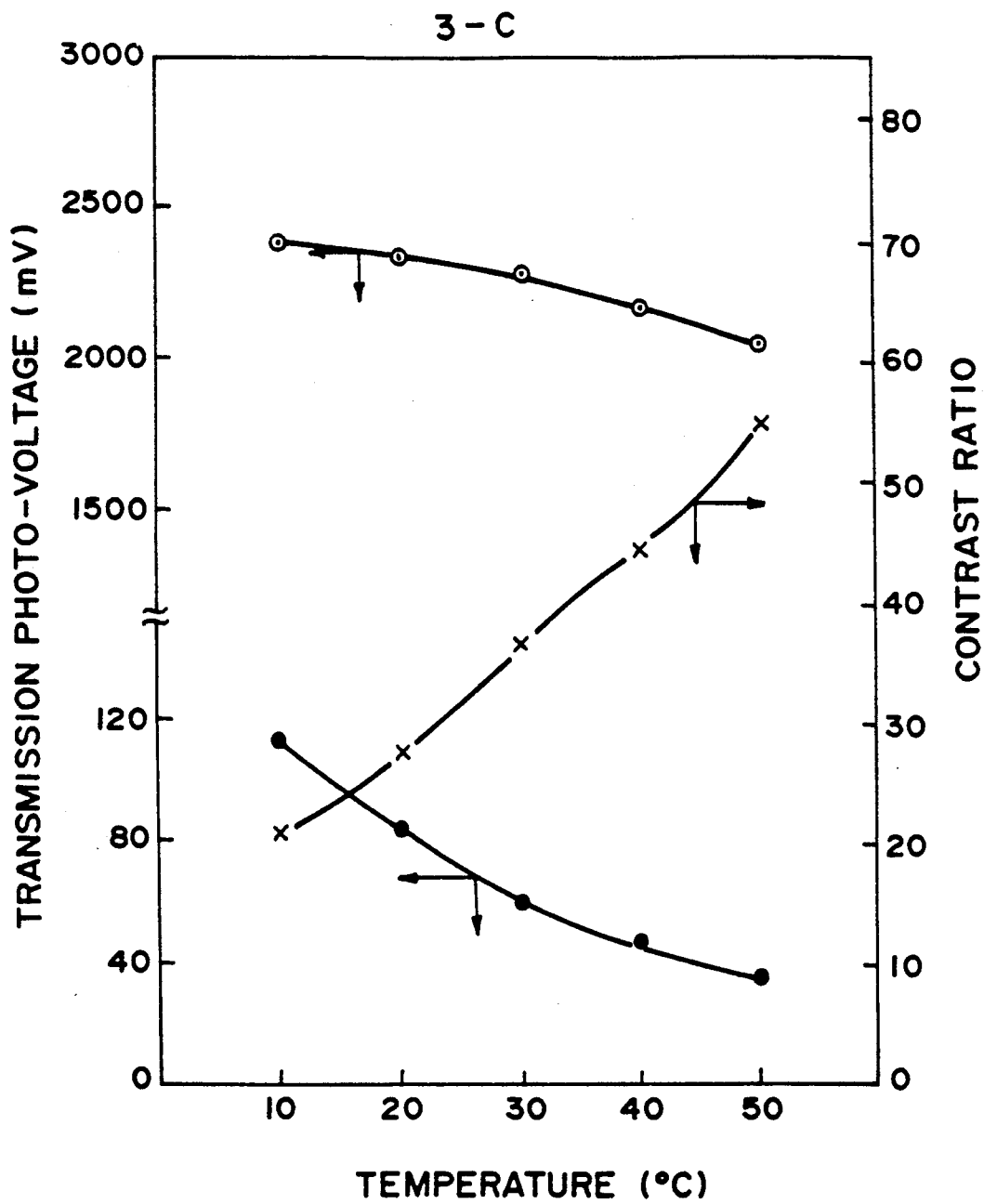

The results of transmittances in white and black states and contrast ratios shown in the above Table 41 are also shown in FIG. 18 (For Composition 3-A), FIG. 19 (3-B) and FIG. 20 (3-C), respectively.

As is clear from the above results, the liquid crystal devices using the compositions 3-A and 3-B respectively showing a maximum of cone angle on temperature decrease were substantially free from lowering in contrast at low temperatures and showed low contrast variation factors of 1.32 and 1.50, thus showing clearly better performances than the device containing the composition 3-C. Further, broader drive voltage margin and drive temperature margin were provided.

EXAMPLES 17 AND 18

Compositions 5-A, 5-B, 6-A and 6-B having different cone angle characteristics were prepared by mixing compounds listed in the following Table B, wherein $R_1$-$R_{12}$ respectively denote a normal alkyl group capable of having different numbers of carbon atoms and the numbers connected by / represented a pair of carbon numbers contained in a compound, e.g., 8/10 for $R_1/R_2$ representing a compound:

TABLE 42

| L.C. | $T_{PT}$(°C.) Cry | Sc* | SA | Ch | Iso | Ps(30° C.) nC/cm² |
|---|---|---|---|---|---|---|
| 5-A | −9.5 → ← −13.4 | ← 67.8 | ← 86.8 | ← 93.3 | | 6.1 |
| 5-B | −9.9 → ← −12.5 | ← 64.2 | ← 79.8 | ← 85.7 | | 6.4 |

TABLE B

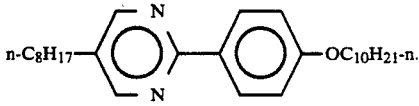

n-C$_8$H$_{17}$—pyridine—phenyl—OC$_{10}$H$_{21}$-n.

| | Example 17 | | Example 18 | |
|---|---|---|---|---|
| | 5-A | 5-B | 6-A | 6-B |

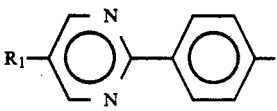

R$_1$/R$_2$

| 8/10 | 8/10 | 6/12 | 6/10 |
| 10/8 | 10/8 | 8/9 | 8/10 |
| 6/10 | 6/10 | 8/10 | 9/8 |
| 8/6 | 8/6 | | |

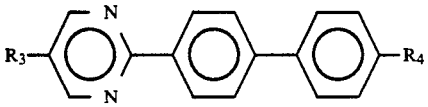

R$_3$/R$_4$

| 7/7 | 7/7 | 7/7 | 7/4 |
| 7/5 | 7/5 | 7/5 | 7/5 |

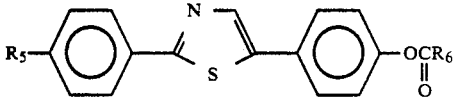

R$_5$/R$_6$

| 6/6 | 6/6 | — | 6/6 |
| | 6/8 | | |

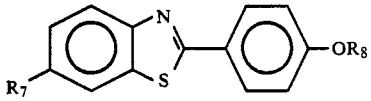

R$_7$/R$_8$

| 6/8 | — | 6/4 | — |

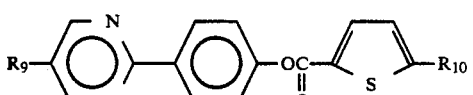

R$_9$/R$_{10}$

| 11/4 | 11/4 | — | — |

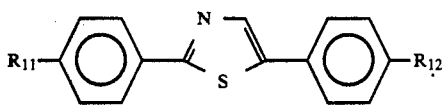

R$_{11}$/R$_{12}$

| 6/9 | 6/9 | — | — |

EXAMPLE 15

The liquid crystal compositions 5-A and 5-B showed the phase transition temperatures ($T_{PT}$) and spontaneous polarization at 30° C. (Ps (30° C.)) as follows.

The compositions 5-A and 5-B showed the temperature dependence of cover angle (H) as shown below.

TABLE 43

| | Cone angle (degrees) Temperature (°C.) | | | | | |
|---|---|---|---|---|---|---|
| L.C. | 10 | 20 | 30 | 40 | 45 | 50 |
| 5-A | 14.7 | 15.1 | 15.1 | 14.1 | — | 10.6 |
| 5-B | 15.5 | 16.0 | 16.2 | 14.5 | — | 9.2 |

Ferroelectric liquid crystal devices were prepared are evaluated with respect to drive voltage margins ΔV in the same manner as in Example 15 except that the liquid crystal compositions 5-A and 5-B were used instead of the liquid crystal compositions 2-A and 2-B.

The thus-prepared devices showed the results given in the following Tables 44 and 45.

TABLE 44

| L.C. 5-A | 10° C. | 20° C. | 30° C. | 40° C. | 50° C. |
|---|---|---|---|---|---|
| Drive voltage margin ΔV (V) | 5.4 | 6.2 | 8.2 | 8.5 | 4.0 |
| Set Δt (μsec) | 128 | 120 | 90 | 56 | 24 |

TABLE 45

| L.C. 5-B | 10° C. | 20° C. | 30° C. | 40° C. | 50° C. |
|---|---|---|---|---|---|
| Drive voltage margin ΔV (V) | 5.0 | 6.1 | 8.3 | 8.3 | 3.8 |
| Set Δt (μsec) | 176 | 160 | 115 | 77 | 30 |

Further, the devices using the compositions 5-A and 5-B showed the following drive temperature margin at 30° C.

| | Drive temperature margin |
|---|---|
| Composition 5-A | ±8.0° C. |
| Composition 5-B | ±7.5° C. |

Further, the devices showed the transmittances at white and black levels and contrasts shown in the following Table 46.

TABLE 46

| L.C. | | Photo-voltage (mV)/Contrast (—) | | | | |
|---|---|---|---|---|---|---|
| | | 10° C. | 20° C. | 30° C. | 40° C. | 50° C. |
| 5-A | Transmittance of white | 1920 | 2040 | 2030 | 1910 | 1700 |
| | Transmittance of black | 41 | 47 | 48 | 41 | 28 |
| | Contrast | 47 | 43 | 42 | 47 | 61 |
| 5-B | Transmittance of white | 2000 | 2140 | 2150 | 2080 | 1760 |
| | Transmittance of black | 44 | 56 | 58 | 45 | 27 |
| | Contrast | 45 | 38 | 37 | 46 | 65 |

Then, the devices using the compositions 5-A and 5-B showed contrast variation factors of 1.45 and 1.76, respectively.

As is understood from the above results, of the liquid crystal devices using the liquid crystal compositions 5-A and 5-B, respectively, each showing a maximum cone angle $(H)_{max}$, the device containing the composition 5-A showing a $(H)_{max}/(H)_{min}$ ratio of 1.42 (i.e. <1.5) showed a smaller variation in contrast than the device containing the composition 5-B having a $(H)_{max}/(H)_{min}$ ratio of 1.76 (i.e., ≧1.5).

EXAMPLE 18

Ferroelectric liquid crystal devices were prepared in the same manner as in Example 15 except that the compositions 6-A and 6-B prepared above were used instead of the compositions 2-A and 2-B. Then, the liquid crystal devices were tried to be driven in the same manner as in Example 15 so as to measure the drive voltage margin ΔV. However, both the compositions 6-A and 6-B failed to provide a homogeneous uniform alignment state, so that the drive voltage margin and transmittances could not be measured.

As has been described above, a liquid crystal composition showing a layer inclination angle δ which increases on temperature decrease to assume a maximum $δ_{max}$ and then decreases on further temperature decrease, and a liquid crystal device containing such a liquid crystal composition, according to the present invention, show an alleviated temperature-dependence of response speed.

Further, it has become possible to control the temperature region providing an improved temperature-dependence of response speed by controlling the temperature providing $δ_{max}$. Further, by controlling the δ, it has become possible to improve the response speed.

Further, a good display apparatus can be provided by combining the liquid crystal device according to the present invention with a light source and a drive circuit.

Further, the liquid crystal device of the present invention provides a high contrast and an improved persistence characteristic at low temperatures and is alleviated in temperature-dependence of drive conditions, thus providing a liquid crystal display apparatus capable of realizing a very excellent display.

Further, the liquid crystal device containing a liquid crystal composition showing a maximum cone angle, is free from lowering in contrast at low temperatures and is only accompanied with minimum contrast variation with temperature change.

Further, it has become possible to provide a liquid crystal device accompanied with minimum contrast variation by suppressing the ratio of $(H)_{max}/(H)_{min}$ to below 1.5.

Further, it has become possible to provide a liquid crystal device which has a large drive voltage margin and a broad temperature margin allowing a good matrix drive over the entire pixels.

What is claimed is:

1. A liquid crystal composition having a temperature range where the composition assumes chiral smectic C phase, said temperature range including:
   a) a first temperature range where the liquid crystal composition shows a cone angle in chiral smectic C phase which increases on temperature decrease down to a mediate temperature, and
   b) a second temperature range, below the first temperature range, where the liquid crystal composition shows a cone angle in chiral smectic C phase which decreases on further temperature decrease below the mediate temperature.

2. A liquid crystal composition according to claim 1, wherein the liquid crystal composition also has a temperature range of smectic A phase, and the mediate temperature appears in a temperature range between (Tc-10) °C. and 10° C., wherein Tc denotes a phase transition temperature from the smectic A phase to the chiral smectic C phase.

3. A liquid crystal composition according to claim 1, wherein the liquid crystal composition also has a temperature range of smectic A phase, and the mediate temperature appears in a temperature range between (Tc-10) °C. and 20° C., wherein Tc denotes a phase transition temperature from the smectic A phase to the chiral smectic C phase.

4. A liquid crystal composition according to claim 1, wherein the liquid crystal composition also has a temperature range of smectic A phase, and the mediate temperature appears in a temperature range between (Tc-10) °C. and 30° C., wherein Tc denotes a phase transition temperature from the smectic A phase to the chiral smectic C phase.

5. A liquid crystal composition according to claim 1, wherein the composition also has a temperature range of cholesteric phase.

6. A liquid crystal device, comprising: a pair of substrates, and a liquid crystal composition disposed between the substrates and placed in a temperature range where the composition assumes chiral smectic C phase, said temperature range including:
 a) a first temperature range where the liquid crystal composition shows a cone angle in chiral smectic C phase which increases on temperature decrease down to a mediate temperature, and
 b) a second temperature range, below the first temperature range, where the liquid crystal composition shows a cone angle in chiral smectic C phase which decreases on further temperature decrease below the mediate temperature.

7. A device according to claim 6, wherein at least one of said pair of substrates is provided with a uniaxial alignment axis.

8. A device according to claim 7, wherein said uniaxial alignment axis has been provided by rubbing.

9. A device according to claim 6, wherein said pair of substrates are respectively provided with a uniaxial alignment axis in respective directions which are parallel and the same as or opposite to each other.

10. A device according to claim 9, wherein said uniaxial alignment axis has been provided by rubbing.

11. A device according to claim 6, wherein said pair of substrates are respectively provided with a uniaxial alignment axis in respective directions which intersect each other.

12. A device according to claim 11, wherein said respective directions intersect each other at an angle of 2-15 degrees.

13. A device according to claim 12, wherein said uniaxial alignment axis has been provided by rubbing.

14. A device according to claim 6, wherein said liquid crystal composition also has a temperature range of smectic A phase, is placed in the chiral smectic C phase through cooling from the smectic A phase and has the mediate temperature in a temperature range between (Tc-10) °C. and 10° C., wherein Tc denotes a phase temperature from the smectic A phase to the chiral smectic C. phase.

15. A device according to claim 6, wherein said liquid crystal composition also has a temperature range of smectic A phase, is placed in the chiral smectic C phase through cooling from the smectic A phase and has the mediate temperature in a temperature range between (Tc-10) °C. and 20° C., wherein Tc denotes a phase temperature from the smectic A phase to the chiral smectic C phase.

16. A device according to claim 6, wherein said liquid crystal composition also has a temperature range of smectic A phase, is placed in the chiral smectic C phase through cooling from the smectic A phase and has the mediate temperature in a temperature range between (Tc-10) °C. and 30° C., wherein Tc denotes a phase temperature from the smectic A phase to the chiral smectic C phase.

17. A device according to claim 6, wherein said liquid crystal composition also has temperature ranges of cholesteric phase and smectic A phase, respectively, and is placed in the chiral smectic C phase through cooling from the cholesteric phase and the smectic A phase.

18. A liquid crystal device, comprising: a pair of substrates, and a liquid crystal composition disposed between the substrates and placed in an alignment state of chiral smectic C phase such that the liquid crystal molecules are oriented to any one of at least two optically stable states which form an angle $2\theta a$ therebetween ($\theta a$; tilt angle) in the absence of an electric field; the liquid crystal molecules are aligned to form a plurality of liquid crystal molecular layers of chiral smectic C phase each comprising a plurality of molecules and being inclined at an inclination angle $\delta$ with respect to a normal to the substrates; and the liquid crystal molecules are aligned at a pretilt angle $\alpha$ with respect to the substrates;
 wherein the liquid crystal composition has a temperature range where it assumes the chiral smectic C phase, said temperature range including:
 a) a first temperature range where the liquid crystal composition shows a cone angle $\widehat{H}$ in chiral smectic C phase which increases on temperature decrease down to a mediate temperature, and
 b) a second temperature range, below the first temperature range, where the liquid crystal composition shows a cone angle $\widehat{H}$ in chiral smectic C phase which decreases on further temperature decrease below the mediate temperature; and
 the angles $\theta a$, $\widehat{H}$, $\delta$ and $\alpha$ satisfy the relationships of:
 c) $\widehat{H} < \alpha + \delta$
 d) $\delta < \alpha$, and
 e) $\widehat{H} > \theta a > \widehat{H}/2$.

19. A device according to claim 16, wherein at least one of said pair of substrates is provided with a uniaxial alignment axis.

20. A device according to claim 19, wherein said uniaxial alignment axis has been provided by rubbing.

21. A device according to claim 18, wherein said pair of substrates are respectively provided with a uniaxial alignment axis in respective directions which are parallel and the same as or opposite to each other.

22. A device according to claim 21, wherein said uniaxial alignment axis has been provided by rubbing.

23. A device according to claim 18, wherein said pair of substrates are respectively provided with a uniaxial alignment axis in respective directions which intersect each other.

24. A device according to claim 23, wherein said respective directions intersect each other at an angle of 2-15 degrees.

25. A device according to claim 24, wherein said uniaxial alignment axis has been provided by rubbing.

26. A device according to claim 18, wherein said liquid crystal composition also has a temperature range of smectic A phase, is placed in the chiral smectic C phase through cooling from the smectic A phase and has the mediate temperature in a temperature range between (Tc-10) °C. and 10° C., wherein Tc denotes a phase temperature from the smectic A phase to the chiral smectic C phase.

27. A device according to claim 18, wherein said liquid crystal composition also has a temperature range of smectic A phase, is placed in the chiral smectic C phase through cooling from the smectic A phase and has the mediate temperature in a temperature range between (Tc-10) °C. and 20° C., wherein Tc denotes a phase temperature from the smectic A phase to the chiral smectic C phase.

28. A device according to claim 18, wherein said liquid crystal composition also has a temperature range of smectic A phase, is placed in the chiral smectic C phase through cooling from the smectic A phase and has the mediate temperature in a temperature range between (Tc-10) °C. and 30° C., wherein Tc denotes a phase temperature from the smectic A phase to the chiral smectic C phase.

29. A device according to claim 18, wherein said liquid crystal composition also has temperature ranges of cholesteric phase and smectic A phase, respectively, and is placed in the chiral smectic C phase through cooling from the cholesteric phase and the smectic A phase.

30. A display apparatus, including:
a liquid crystal device comprising a pair of substrates, and a liquid crystal composition disposed between the substrates and placed in a temperature range where the composition assumes chiral smectic C phase, and
voltage application means for applying voltages across the liquid crystal composition,
said temperature range of chiral smectic C phase including:
a) a first temperature range where the liquid crystal composition shows a cone angle in chiral smectic C phase which increases on temperature decrease down to a mediate temperature, and
b) a second temperature range, below the first temperature range, where the liquid crystal composition shows a cone angle in chiral smectic C phase which decreases on further temperature decrease below the mediate temperature.

31. A display apparatus according to claim 30, further including control means for controlling the voltage application means.

32. A display apparatus, including:
a liquid crystal device comprising a pair of substrates, and a liquid crystal composition disposed between the substrates, and
voltage application means for applying voltages across the liquid crystal composition;
said liquid crystal composition being placed in an alignment state of chiral smectic C phase such that the liquid crystal molecules are oriented to any one of at least two optically stable states which form an angle $2\theta a$ therebetween ($\theta a$; tilt angle) in the absence of an electric field; the liquid crystal molecules are aligned to form a plurality of liquid crystal molecular layers of chiral smectic C phase each comprising a plurality of molecules and being inclined at an inclination angle $\delta$ with respect to a normal to the substrates; and the liquid crystal molecules are aligned at a pretilt angle $\alpha$ with respect to the substrates;

wherein the liquid crystal composition has a temperature range where it assumes the chiral smectic C phase, said temperature range including:
a) a first temperature range where the liquid crystal composition shows a cone angle $(H)$ in chiral smectic C phase which increases on temperature decrease down to a mediate temperature, and
b) a second temperature range, below the first temperature range, where the liquid crystal composition shows a cone angle $(H)$ in chiral smectic C phase which decreases on further temperature decrease below the mediate temperature; and
the angles $\theta a$, $(H)$, $\delta$ and $\alpha$ satisfy the relationships of:
c) $(H) < \alpha + \delta$,
d) $\delta < \alpha$, and
e) $(H) > \theta a > (H)/2$.

33. A display apparatus according to claim 32, further including control means for controlling the voltage application means.

34. A liquid crystal composition, having: a temperature range of smectic A phase wherein the composition forms a plurality of first molecular layers each composed of plural liquid crystal molecules in smectic A phase, and also a temperature range of chiral smectic C phase wherein the composition forms a plurality of second molecular layers each composed of plural liquid crystal molecules in chiral smectic C phase, the second molecular layers being formed through deformation from the first molecular layers and showing a degree of deformation with respect to the first molecular layers which varies at different temperatures;
said temperature range of chiral smectic C phase including
a) a first temperature range where the second molecular layers show a degree of deformation which increases on temperature decrease down to a mediate temperature, and
b) a second temperature range, below the first temperature range, where the second molecular layers show a degree of deformation which decreases on further temperature decrease below the mediate temperature.

35. A liquid crystal composition according to claim 34, wherein the mediate temperature appears at a temperature of at least 10° C.

36. A liquid crystal composition according to claim 34, wherein the mediate temperature appears at a temperature of at least 25° C.

37. A liquid crystal composition according to claim 34, which further has a temperature range of cholesteric phase.

38. A liquid crystal device, comprising: a pair of substrates, and a liquid crystal composition disposed between the substrates and placed in a temperature range of chiral smectic C phase and in an alignment state such that the liquid crystal molecules are aligned to form a plurality of molecular layers each composed of plural liquid crystal molecules and being inclined at an inclination angle $\delta$ with respect to a normal to the substrates; said temperature range of chiral smectic C phase including:
a) a first temperature range where the inclination angle $\delta$ increases on temperature decrease down to a mediate temperature, and
b) a second temperature range, below the first temperature range, where the inclination angle $\delta$ decreases on further temperature decrease below the mediate temperature.

39. A device according to claim 38, wherein at least one of said pair of substrates is provided with a uniaxial alignment axis.

40. A device according to claim 39, wherein said uniaxial alignment axis has been provided by rubbing.

41. A device according to claim 38, wherein said pair of substrates are respectively provided with a uniaxial alignment axis in respective directions which are parallel and the same as or opposite to each other.

42. A device according to claim 41, wherein said uniaxial alignment axis has been provided by rubbing.

43. A device according to claim 38, wherein said pair of substrates are respectively provided with a uniaxial alignment axis in respective directions which intersect each other.

44. A device according to claim 43, wherein said respective directions intersect each other at an angle of 2-15 degrees.

45. A device according to claim 38, wherein said uniaxial alignment axis has been provided by rubbing.

46. A device according to claim 38, wherein the medium temperature appears at a temperature of at least 10° C., and the liquid crystal composition also has a temperature range of smectic A phase and is placed in the chiral smectic C phase through cooling from the smectic A phase.

47. A device according to claim 38, wherein the medium temperature appears at a temperature of at least 25° C., and the liquid crystal composition also has a temperature range of smectic A phase and is placed in the chiral smectic C phase through cooling from the smectic A phase.

48. A device according to claim 38, wherein the liquid crystal composition also has temperature ranges of cholesteric phase and smectic A phase, respectively, and is placed in the chiral smectic C phase though cooling from the cholesteric phase and smectic A phase.

49. A liquid crystal device according to claim 38, wherein said liquid crystal composition in chiral smectic C phase has a maximum $\delta_{max}$ of the inclination angle $\delta$ satisfying $\delta_{max} \leq 20$ degrees and has been formed by cooling from smectic A phase.

50. A liquid crystal device according to claim 38, wherein said liquid crystal composition in chiral smectic C phase has a maximum $\delta_{max}$ of the inclination angle $\delta$ satisfying $\delta_{max} \leq 15$ degrees and has been formed by cooling from smectic A phase.

51. A liquid crystal device, comprising: a pair of substrates, and a liquid crystal composition having a cone angle $(H)$, disposed between the substrates and placed in an alignment state of chiral smectic C phase such that the liquid crystal molecules are oriented to any one of at least two optically stable states which form an angle $2\theta a$ therebetween ($\theta a$; tilt angle) in the absence of an electric field; the liquid crystal molecules are aligned to form a plurality of liquid crystal molecular layers of chiral smectic C phase each comprising a plurality of molecules and being inclined at an inclination angle $\delta$ with respect to a normal to the substrates; and the liquid crystal molecules are aligned at a pretilt angle $\alpha$ with respect to the substrates;

wherein the liquid crystal composition has a temperature range where it assumes the chiral smectic C phase, said temperature range including:

a) a first temperature range where the inclination angle $\delta$ in chiral smectic C phase increases on temperature decrease down to a mediate temperature, and b) a second temperature range, below the first temperature range, where the inclination angle $\delta$ in chiral smectic C phase decreases on further temperature decrease below the mediate temperature; and the angles $\theta a$, $(H)$, $\delta$ and $\alpha$ satisfy the relationships of:
c) $(H) < \alpha + \delta$,
d) $\delta < \alpha$, and
e) $(H) > \theta a > (H)/2$.

52. A device according to claim 51, wherein at least one of said pair of substrates is provided with a uniaxial alignment axis.

53. A device according to claim 52, wherein said uniaxial alignment axis has been provided by rubbing.

54. A device according to claim 51, wherein said pair of substrates are respectively provided with a uniaxial alignment axis in respective directions which are parallel and the same as or opposite to each other.

55. A device according to claim 54, wherein said uniaxial alignment axis has been provided by rubbing.

56. A device according to claim 51, wherein said pair of substrates are respectively provided with a uniaxial alignment axis in respective directions which intersect each other.

57. A device according to claim 56, wherein said respective directions intersect each other at an angle of 2-15 degrees.

58. A device according to claim 57, wherein said uniaxial alignment axis has been provided by rubbing.

59. A device according to claim 51, wherein the medium temperature appears at a temperature of at least 10° C., and the liquid crystal composition also has a temperature range of smectic A phase and is placed in the chiral smectic C phase through cooling from the smectic A phase.

60. A device according to claim 51, wherein the medium temperature appears at a temperature of at least 25° C., and the liquid crystal composition also has a temperature range of smectic A phase and is placed in the chiral smectic C phase through cooling from the smectic A phase.

61. A device according to claim 51, wherein the liquid crystal composition also has temperature ranges of cholesteric phase and smectic A phase, respectively, and is placed in the chiral smectic C phase through cooling from the cholesteric phase and smectic A phase.

62. A display apparatus, including:
a liquid crystal device comprising a pair of substrates, and a liquid crystal composition disposed between the substrates,
voltage application means for applying voltages across the liquid crystal composition,
said liquid crystal composition being placed in a temperature range of chiral smectic C phase and in an alignment state such that the liquid crystal molecules are aligned to form a plurality of molecular layers each composed of plural liquid crystal molecules and being inclined at an inclination angle $\delta$ with respect to a normal to the substrates; said temperature range of chiral smectic C phase including:

a) a first temperature range where the inclination angle $\delta$ increases on temperature decrease down to a mediate temperature, and b) a second temperature range, below the first temperature range, where the inclination angle $\delta$ decreases on further temperature decrease below the mediate temperature.

63. A display apparatus according to claim 62, further including control means for controlling the voltage application means.

64. A display apparatus, including:
a liquid crystal device comprising a pair of substrates, and a liquid crystal composition having a cone angle Ⓗ and disposed between the substrates,
voltage application means for applying voltages across the liquid crystal composition,
said liquid crystal composition being placed in an alignment state of chiral smectic C phase such that the liquid crystal molecules are oriented to any one of at least two optically stable states which form an angle $2\theta a$ therebetween ($\theta a$; tilt angle) in the absence of an electric field; the liquid crystal molecules are aligned to form a plurality of liquid crystal molecular layers of chiral smectic C phase each comprising a plurality of molecules and being inclined at an inclination angle $\delta$ with respect to a normal to the substrates; and the liquid crystal molecules are aligned at a pretilt angle $\alpha$ with respect to the substrates;
wherein the liquid crystal composition has a temperature range where it assumes the chiral smectic phase, said temperature range including:
a) a first temperature range where the inclination angle $\delta$ in chiral smectic C phase increases on temperature decrease down to a mediate temperature, and
b) a second temperature range, below the first temperature range, where the inclination angle $\delta$ in chiral smectic C phase decreases on further temperature decrease below the mediate temperature; and the angles $\theta a$, Ⓗ, $\delta$ and $\alpha$ satisfy the relationships of:
c) Ⓗ $< \alpha + \delta$,
d) $\delta < \alpha$, and
e) Ⓗ $> \theta a >$ Ⓗ$/2$.

65. A display apparatus according to claim 64, further including control means for controlling the voltage application means.

* * * * *

UNITED STATES PATENT AND TRADEMARK OFFICE
CERTIFICATE OF CORRECTION

PATENT NO. : 5,305,131
DATED : April 19, 1994
INVENTOR(S) : MASAHIRO TERADA, ET AL.

Page 1 of 3

It is certified that error appears in the above-identified patent and that said Letters Patent is hereby corrected as shown below:

COLUMN 4

Line 25, "having:" should read --having--.
Line 38, "including" should read --including:--.
Line 45, "degrees" should read --degree--.

COLUMN 5

Line 48, "alignment;" should read --alignment,--.

COLUMN 7

Line 7, "heads" should read --beads--.

COLUMN 8

Line 21, "thereof," should read --thereto,--.
Line 62, "C114 C2" should read --C1$\longrightarrow$C2--.

COLUMN 11

Line 64, "temperature-dependence" should read --temperature-dependences--.

COLUMN 16

Line 20, "$V_s+V_I$)" should read --($V_s+V_I$)--.

COLUMN 18

Line 4, "$OC_2H_{5-n}$." should read --$OC_5H_{11-n}$.--.

UNITED STATES PATENT AND TRADEMARK OFFICE
CERTIFICATE OF CORRECTION

PATENT NO. : 5,305,131
DATED : April 19, 1994
INVENTOR(S) : MASAHIRO TERADA, ET AL.

Page 2 of 3

It is certified that error appears in the above-identified patent and that said Letters Patent is hereby corrected as shown below:

COLUMN 25

Line 52, "together)" should read --together--.

COLUMN 26

Line 37, "follows." should read --follows:--.

COLUMN 27

Line 27, "subjected" should read --subjected to--.

COLUMN 28

Line 21, "follows." should read --follows:--.

COLUMN 29

TABLE 26, "hC/cm$^2$" should read --nC/cm$^2$--.

COLUMN 31

Line 25, "temperature-dependence" should read --temperature-dependences--.
Line 39, "Arrhenires3" should read --Arrhenires--.

COLUMN 38

Line 68, "ture dependence" should read --ture-dependence--.

UNITED STATES PATENT AND TRADEMARK OFFICE
CERTIFICATE OF CORRECTION

PATENT NO. : 5,305,131
DATED : April 19, 1994
INVENTOR(S) : MASAHIRO TERADA, ET AL.

It is certified that error appears in the above-identified patent and that said Letters Patent is hereby corrected as shown below:

<u>COLUMN 41</u>

Line 60, "C." should read --C--.

<u>COLUMN 44</u>

Line 33, "including" should read --including:--.

Signed and Sealed this

Eighteenth Day of October, 1994

Attest:

BRUCE LEHMAN

Attesting Officer

Commissioner of Patents and Trademarks